United States Patent [19]
Barrientos

[11] Patent Number: 5,910,899
[45] Date of Patent: Jun. 8, 1999

[54] METHOD FOR PERFORMING FLOORPLAN TIMING ANALYSIS USING MULTI-DIMENSIONAL FEEDBACK IN A SPREADSHEET WITH COMPUTED HYPERLINKS TO PHYSICAL LAYOUT GRAPHICS AND INTEGRATED CIRCUIT MADE USING SAME

[75] Inventor: Carlo E. Barrientos, Round Rock, Tex.

[73] Assignee: Advanced Micro Devices, Inc.

[21] Appl. No.: 08/736,920

[22] Filed: Oct. 25, 1996

[51] Int. Cl.⁶ .................................................. G06H 17/50
[52] U.S. Cl. ........................ 364/491; 364/489; 364/488
[58] Field of Search .................................. 364/488, 489, 364/490, 491, 578

[56] References Cited

U.S. PATENT DOCUMENTS

| | | | |
|---|---|---|---|
| 4,970,664 | 11/1990 | Kaiser et al. | 364/521 |
| 5,220,512 | 6/1993 | Watkins et al. | 364/489 |
| 5,278,769 | 1/1994 | Bair et al. | 364/490 |
| 5,381,524 | 1/1995 | Lewis et al. | 395/161 |
| 5,383,167 | 1/1995 | Weil | 364/488 |
| 5,402,358 | 3/1995 | Smith et al. | 364/490 |
| 5,461,576 | 10/1995 | Tsay et al. | 364/490 |
| 5,507,029 | 4/1996 | Granato et al. | 395/500 |
| 5,521,837 | 5/1996 | Frankle et al. | 364/491 |
| 5,530,942 | 6/1996 | Tzou et al. | 387/362 |
| 5,541,849 | 7/1996 | Rostoker et al. | 364/489 |
| 5,555,201 | 9/1996 | Dangelo et al. | 364/489 |
| 5,576,979 | 11/1996 | Lewis et al. | 364/578 |
| 5,610,833 | 3/1997 | Chang et al. | 364/491 |
| 5,623,418 | 4/1997 | Rostoker et al. | 364/489 |

OTHER PUBLICATIONS

D. Sriram, "Knowledge–Based Approaches for Structural Design," Topics in Engineering vol. 1, 1987, 5 pages.

Jürgen Herrmann and Renate Beckmann, "Left—A System That Learns Rules About VLSI–Design From Structural Descriptions," Applied Artificial Intelligence, An International Journal, vol. 8, No. 1, 1994, 24 pages.

Vinod Narayananan, David LaPotin, Rajesh Gupta and Gopal Vijayan, "Pepper—A Timing Driven Early Floorplanner," pp. 230–235, 1995.

*Primary Examiner*—Kevin J. Teska
*Assistant Examiner*—Leigh Marie Garbowski
*Attorney, Agent, or Firm*—Kevin L. Daffer; Robert C. Kowert; Conley, Rose & Tayon

[57] ABSTRACT

A computer-implemented method for aiding in the design of an integrated circuit (IC) floorplan. The method comprises receiving a netlist, physical layout information, and timing constraints of the IC and performing timing analysis of the signal paths of the IC. The user selects the set of nets to by analyzed. The timing analysis comprises calculating net delays as a function of the length of the signal paths. The timing analysis further comprises calculating slack times by subtracting from the clock cycle time of the IC the sum of the driven at timing constraint, the needed by timing constraint, and the net delay. Paths which have a slack time greater than a slack failure value are passing nets and paths which have a slack time greater than a slack failure value are failing nets. The slack failure value is user-specifiable and defaults to zero. The method further comprises displaying in a spreadsheet the timing constraints, net delays, and slack times for each path selected, thus providing the designer with complex multi-dimensional feedback. The feedback for each path in the spreadsheet is accompanied by a hyperlink button, which the designer selects in order to graphically display the path on a graphical view of the floorplan. Thus the designer is enabled to relate the non-graphical timing information to a graphical display of the paths and apply his or her intuitive knowledge to make necessary changes to the floorplan. The timing information is further summarily displayed in a histogram, thus providing visual feedback regarding the timing quality of the floorplan. The method provides means for the designer to display failing paths, passing paths, all paths, and paths skipped in timing analysis due to the absence of timing constraints.

32 Claims, 28 Drawing Sheets

Manhattan Path Distance = X + Y

METHOD FOR PERFORMING FLOORPLAN TIMING ANALYSIS USING MULTI-DIMENSIONAL FEEDBACK IN A SPREADSHEET WITH COMPUTED HYPERLINKS TO PHYSICAL LAYOUT GRAPHICS AND INTEGRATED CIRCUIT MADE USING SAME

BACKGROUND OF THE INVENTION

1. Field of the Invention

The present invention relates to computer-aided design (CAD) tools for arranging the layout of features ("floorplanning") within very large scale integrated (VLSI) circuits, and in particular to timing analysis of VLSI circuit floorplans.

2. Description of the Relevant Art

Designing a very large scale integrated (VLSI) circuit, or chip, is an extremely complex task comprising numerous constituent complex tasks. One of the constituent complex tasks involved in designing a VLSI circuit is the "floorplanning" of the circuit. Typically, VLSI circuits are fabricated as a wafer on a monolithic substrate, a typical substrate being silicon. The wafer is subdivided into a grid of rectangular sections referred to as die. Each die contains a copy of the VLSI circuit. After wafer fabrication, the die are cut apart and bonded to chip carriers to be incorporated onto integrated circuit boards. The VLSI circuits comprise numerous logic gates, typically grouped together in logical functional blocks, which are interconnected by wires, commonly referred to as nets. A netlist specifies the logical manner, as opposed to the physical manner, in which the logical blocks are interconnected. The notion of floorplanning relates to the physical placement of the various logic blocks, i.e., circuit elements, on the physical layout space of the silicon die.

Floorplanning, i.e., the physical placement of the logic blocks, affects a number of aspects of the design. In particular, the physical location of the logic blocks affects the power consumption, die size, routability, and timing delays of the chip. Since nets consume precious space, the less efficiently the blocks are physically placed, the larger the die size required in order to route all of the nets.

However, in many instances the die size is fixed prior to the floorplanning phase of the design. Hence, the floorplanner must choose locations for the blocks which will allow the chip to be routed within the given constraint of the die size. If the floorplanner is not sufficiently skilled or does not have sufficient tools, he or she may not even be able to route the chip. In addition, power consumption is affected by the floorplan, in particular by the fact that certain gates may have to be increased in their size in order to meet timing constraints imposed by the clock speed of the chip.

Finally, the physical location of the logic blocks affects the timing delays, or net delays, of the chip. This is because the farther a signal must travel from one block to another, the greater the net delay.

As previously mentioned, digital logic circuits are typically comprised of functional blocks interconnected by nets. Examples of functional blocks are arithmetic logic units (ALU), data and instruction caches, register files, instruction microcode blocks, etc. These blocks are comprised of more elementary logic circuits such as flip-flops, AND gates, OR gates, EXCLUSIVE OR gates, inverters, etc. These logic elements in turn comprise transistors. Transistors, or other semiconductor devices, such as capacitors, resistors, diodes, etc., comprise terminals as shown in FIG. 1. In FIG. 1, the transistor comprises a source terminal, a drain terminal and a gate terminal.

Higher level logic blocks also include terminals, which are the terminals of the logic elements of the logic block at the interface of the logic block. For example, an ALU may have a carry bit terminal, wherein the carry bit terminal is actually an output terminal of an AND gate which is part of the carry bit circuitry of the ALU, and the output terminal of the AND gate is the terminal of a transistor which is part of the AND gate. Thus, a hierarchical structure exists among the various circuit elements.

The wires which connect the terminals are referred to as nets. A net is comprised of one or more signal paths. The portion of a net which connects a source terminal and a destination terminal on a net is a path. If a net has only two terminals, then the net has only one path, i.e., the connection between the two terminals.

The combinatorial and sequential logic elements of an integrated circuit are governed by a clock signal, which clocks digital values into logic elements such as flip-flops according to a clock cycle. Signals are generated by source logic blocks or elements. These signals incur propagation delays through the transistors of the logic block, and reach a valid logic level at a source (or driver) terminal of the logic block at some time later relative to a rising or falling edge of the clock signal. The amount of time from the beginning of the clock cycle to the time when the source terminal drives the signal to a valid logic level is commonly referred to as the "driven at" (DA) time.

Likewise, signals must be received by destination (or load, or receiver) terminals of destination logic blocks or elements. The signals must arrive at the destination terminals a certain amount of time prior to the next clock cycle to allow for propagation delay time through the transistors of the destination block. The amount of time prior to the next clock cycle which the destination terminal requires the signal level to be valid is commonly referred to as the "needed by" (NB) time. The DA and NB times are referred to as timing constraints.

When logic designers design logic blocks, they specify the timing constraints of the various terminals of the blocks as part of the design information of the chip. A floorplan design must take the timing constraints into consideration and meet the timing constraints set forth in order for the chip to reliably operate at the desired clock rate. Designers commonly employ the notion of "slack time" to evaluate whether or not the timing constraints are being satisfied.

Referring now to FIG. 2, two timing diagrams illustrating slack time calculations are shown. In FIG. 2, a single clock cycle is shown in which a clock cycle begins on the rising edge of the clock signal. The slack time is calculated according to the following equation:

slack time=clock cycle value−(DA+NB+net delay)

The clock cycle value is the amount of time which passes during one clock cycle of the circuit being designed. The net delay is the amount of time required for the signal to be transmitted from the source terminal to the destination terminal. FIG. 2 shows a slack calculation for one path in which the slack time is positive. The path is a "passing" path in that it meets the specified timing constraints. FIG. 2 also shows a slack calculation for a second path in which the slack time is negative. The path is a "failing" path in that it does not meet the specified timing constraints.

The net delay is a function of several properties. In particular, the path length and fanout (number of loads on the net associated with the path), inter alia, determine the net delay. The path length affects the net delay in that a finite of amount of time (nanoseconds or picoseconds) is required for the signals to travel a given amount of distance (microns) on a given net.

Historically, the propagation delay of a signal through a logic gate dominated the net delay of the signal from the source gate to the destination gate. That is, the time required for the signal to be generated through the source gate and received through the destination gate was relatively much greater than the net delay of the signal along the path between the source and destination gates. However, as the geometries of VLSI circuits continues to decrease, the propagation delays through logic gates also continues to decrease. Coincidentally, the die sizes of VLSI circuits have tended to increase. Thus, with modern submicron circuit technologies, net delays have come to be equal to, or in some cases surpass, gate propagation delay times.

As a result, floorplanning is taking a more prominent role in the design of VLSI circuits. The problem of floorplanning a VLSI chip is classified as a complex design task (Sriram, D. *Knowledge-Based Approaches to Structural Design*, CM Publications, 1987) which requires experience, innovation and creativity and which is among the most "difficult" of real-world design problems. The problem is complex because it requires the floorplan designer to make decisions based on a vast multi-dimensional array of factors, many of which require intuitive generalizations based on experience.

The amount of information a floorplan designer must analyze has increased dramatically and the problem has become more complicated by the addition of complex, multi-dimensional timing constraints which are not easily expressed in the two-dimensional and three-dimensional geometric paradigm within which floorplan designers are accustomed to working.

A paper "LEFT—A System that Learns Rules about VLSI-design from Structural Descriptions" (by Jurgen Hermann and Renate Beckmann from the Unversity of Dortmund, Germany, published in the journal, "Applied Artificial Intelligence, An International Journal", Vol. 8, No. 1, 1994) pointed out that the quality of a floorplan solution is difficult to measure and that only "intuitive, interactive" or "artificial learning rule-based" techniques would be able to yield good results. The authors of the paper prototyped a learning-based floorplanner which "learns" complex rules by "watching" an experienced floorplanner do his work.

Other related work includes an interactive timing driven floorplanner described in an article by G. Vijayan, et. al., "Pepper—a Timing Driven Early Floorplanner" ICCD 1995 (Oct. 2–4, 1995) (herein incorporated by reference), which describes a floorplanning tool developed at IBM. The Pepper tool helps users edit a floorplan based on timing constraints and interactive inputs. The Pepper tool attempts to quantify "timing quality" using a cost function which assigns a one-dimensional scalar value to the "quality" of a floorplan design. That is, the Pepper tool provides a single number which is a relative indication of the "goodness" or "badness" of a particular floorplan, but does not, in general, provide feedback regarding specific elements of the design which contribute to its goodness or badness, such as feedback related to the timing constraints from which the numerical grade was determined.

This single scalar numeric grade is more suited to use by an automated design tool for automatically searching the entire solution space for an optimal solution for a given cost function. However, the single number cost function feedback provided by the Pepper tool is not as useful to an intelligent, experienced floorplan designer, who is capable of using much more complex multi-dimensional feedback to improve a design. An automatic tool such as the Pepper tool does not take into account "difficult to express" constraints which the human floorplan designer may have determined from experience. Thus, an improved method of providing feedback regarding the "timing quality" of a particular floorplan alternative in a way that can be used by an experienced floorplan designer is desirable.

SUMMARY OF THE INVENTION

The problems outlined above are in large part solved by the computer-implemented method for aiding in the design of an integrated circuit (IC) floorplan of the present invention. The method employs a floorplan timing analyzer (FPTA), operating in conjunction with a chip floorplan editor and a spreadsheet engine, to provide complex multi-dimensional feedback to a floorplan designer regarding the signal timing quality of his or her physical placement of blocks of an IC.

The FPTA provides multi-dimensional feedback to the designer both in summary statistics (histogram) as well as by providing the contributing information about specific paths or nets which meet and do not meet certain timing constraints. Thus, FPTA enables the designer to relate the non-graphical timing constraints of the IC to the graphical layout of the IC. In this way, the floorplan designer is allowed to "see" a statistical summary of the "timing quality" of a given floorplan and relate the summary to specific failing paths or nets in the graphical display of the floorplan. This complex multi-dimensional view of how a floorplan relates to the specified timing constraints gives the floorplanner an intuitive visual feel for the geometrical placement changes which must be made to remedy the timing violations of a given floorplan choice. Thus, the FPTA provides an improved method for aiding an experienced floorplan designer in designing an IC floorplan over existing methods which provide only scalar (one-dimensional) numerical grade feedback.

Feedback provided by the present FPTA includes spreadsheets of timing information about the paths and nets of the IC, and histograms which provide a visual summary of the timing information. The spreadsheets are hyperlinked to graphical displays of the IC floorplan, enabling the designer to specify particular paths or nets to graphically display. The timing information comprises timing constraints, net delays, and slack times associated with the signal paths of the IC.

The FPTA enables the designer to display failing paths, passing paths, all paths, and failing nets. The FPTA further enables the designer to display paths which were skipped during timing analysis due to the absence of the timing constraints to calculate slack times.

Broadly speaking, the method of the present invention comprises the FPTA receiving floorplan information for an integrated circuit from a design database. The integrated circuit comprises logic blocks, each block having terminals being interconnected by nets, or wires, specified in a netlist included in the design database. The design database further includes a physical location of each of the terminals. Each net comprises one or more signal paths, i.e. a signal path is a connection between a source terminal and a destination terminal. The user selects the set of nets, either explicitly or indirectly by selecting blocks of the integrated circuit, for which timing analysis is to be performed by the FPTA.

The method further comprises the FPTA calculating net delays for the paths as a function of the lengths of the paths and the class of interconnection to be used. The method further comprises the FPTA receiving timing constraints for the terminals of the selected nets from a timing constraints database. The FPTA calculates a slack time for the paths by subtracting from the clock cycle time of the IC the sum of the driven at (DA) timing constraint, the needed by (NB) timing constraint, and the net delay. The FPTA provides timing information, namely, the slack times, net delays, timing constraints, net and path identification, and hyperlink information to the spreadsheet engine. The FPTA instructs the spreadsheet engine to display the timing information (summary and detail information) in a spreadsheet.

The spreadsheet engine displays hyperlink buttons associated with the timing information of each path. A user selects the hyperlink buttons to select one or more paths to be graphically displayed on a view of the floorplan by the chip floorplan editor. The spreadsheet engine also displays a visual indicator indicating whether the path is a passing or failing path, i.e., whether or not the slack time of the path is greater than a slack failure value. The default slack failure value is zero. Preferably, the slack failure value may be specified by the user.

The spreadsheet comprises a means for a user to selectively designate the slack times to be calculated assuming a net delay of zero in order to determine whether or not a suitable floorplan which meets the specified timing constraints theoretically exists.

The spreadsheet engine selectively displays a summary of the timing information in a histogram in response to user input. The histogram is a bar graph of the count of paths versus slack time ranges. The bars of the graph are displayed in a manner visually distinguishing failing slack time ranges from passing slack time ranges. This histogram provides a "visual summary" of the timing quality of the floorplan which is more easily used by an experienced designer than a single scalar numerical grade.

The present invention comprises an integrated circuit having a floorplan designed by the computer-implemented floorplan design method of the present invention. The present invention comprises a computer-readable storage media for operating in a computer system comprising instructions for performing the steps of the computer-implemented floorplan method of the present invention.

BRIEF DESCRIPTION OF THE DRAWINGS

Other objects and advantages of the invention will become apparent upon reading the following detailed description and upon reference to the accompanying drawings in which:

FIG. 12b is a screen shot displaying failing paths according to the menu selection of FIG. 12a;

FIG. 13b is a screen shot displaying failing paths according to the menu selection of FIG. 13a;

FIG. 14b is a screen shot displaying failing paths according to the menu selection of FIG. 14a;

FIG. 15b is a screen shot displaying failing paths according to the menu selection of FIG. 15a;

FIG. 16b is a screen shot displaying skipped paths according to the menu selection of FIG. 16a;

FIG. 17b is a screen shot displaying failing paths according to the menu selection of FIG. 17a;

FIG. 18b is a screen shot displaying Steiner routed nets according to the menu selection of FIG. 18a.

Figure 1:
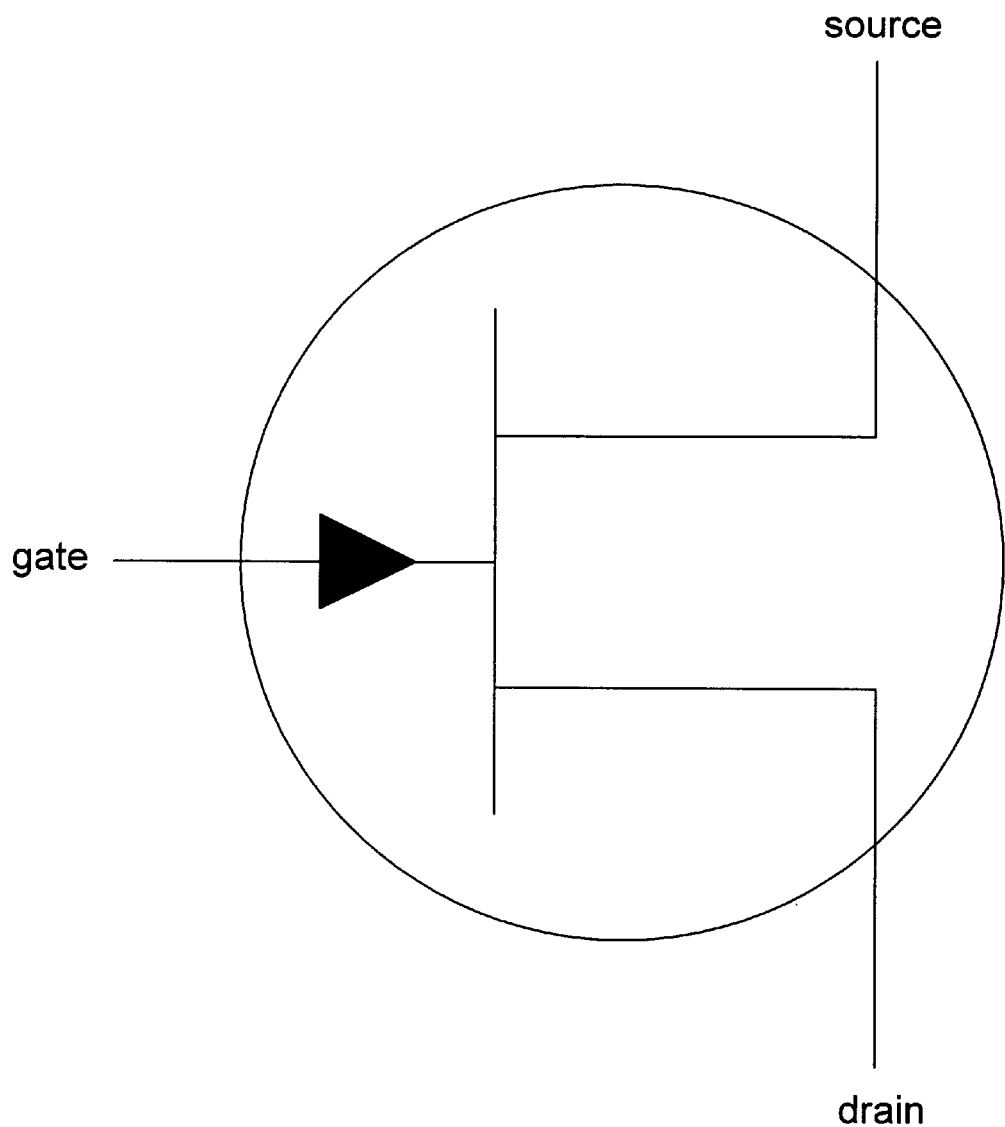
FIG. 1 is a diagram of a conventional transistor including terminals.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Floorplan Timing Analyzer (FPTA)

Figure 3:
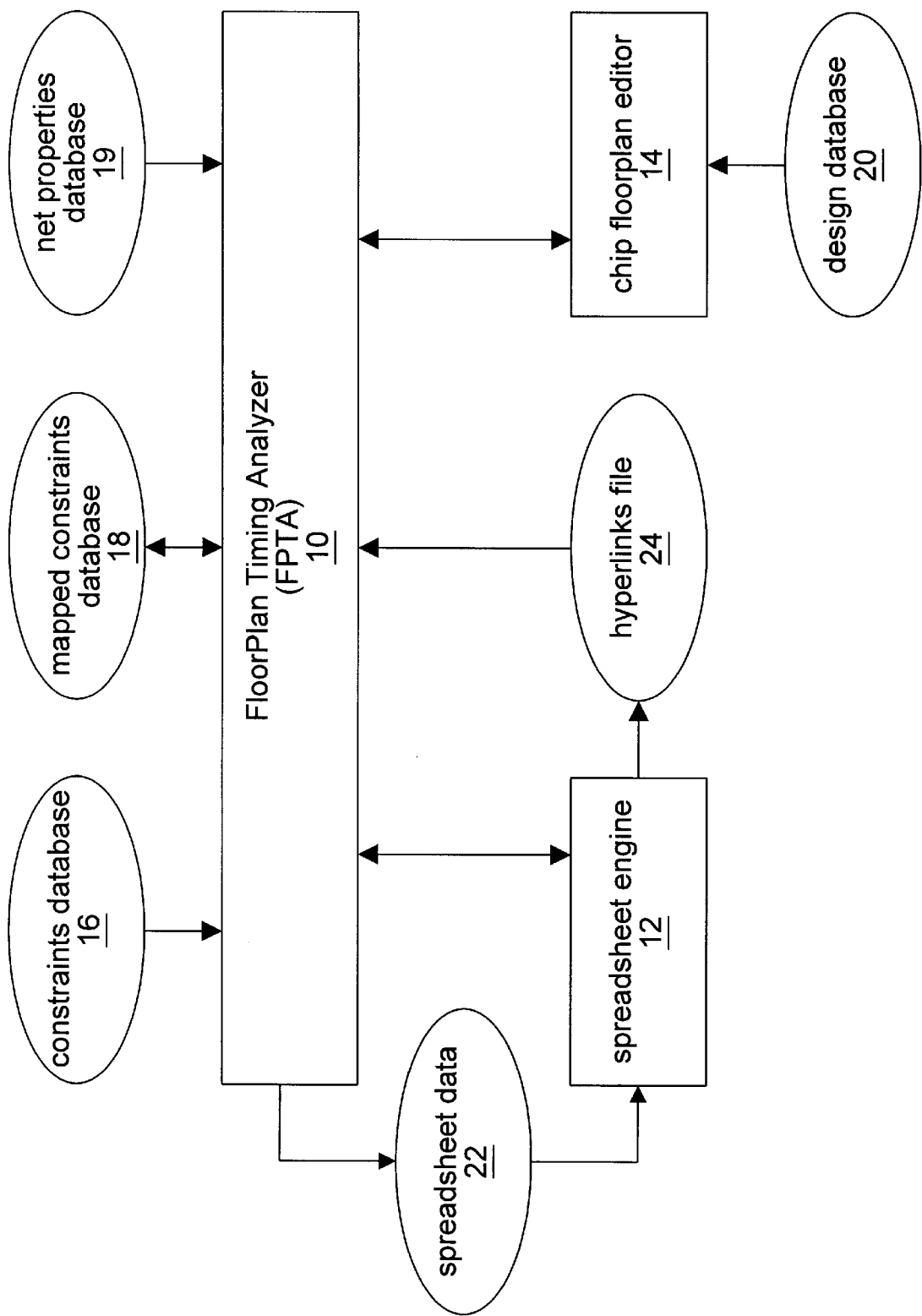
FIG. 3 is a block diagram illustrating the software programs and files, including a floorplan timing analyzer (FPTA), for performing the method of the present invention.

Referring now to FIG. 3, a block diagram illustrating the software programs and files, including a floorplan timing analyzer (FPTA) 10, for performing the method of the present invention is shown. The FPTA 10 operates in conjunction with a chip floorplan editor 14 and a spreadsheet engine 12 to aid integrated circuit (IC) designers in designing an IC floorplan with complex timing and physical layout constraints. The collection of programs aids in the design process by providing complex multi-dimensional feedback on the "timing quality" of a given floorplanning alternative, i.e., a particular choice of placements of the logical blocks of the IC.

The FPTA 10, chip floorplan editor 14, and spreadsheet engine 12 programs execute on a computer system and the constraints database 16, mapped constraints database 18, net properties database 19, design database 20, spreadsheet data 22, and hyperlinks file 24 comprise persistently stored files on the computer system. The computer system comprises a processor, a display screen and an input means, such as a mouse and/or keyboard, whereby an IC designer may provide input. Examples of the computer system are engineering workstations, such as Hewlett-Packard or Sun Microsystem workstations, personal computers, or any other general purpose computer system capable of running a multitasking operating system. Preferably, the multi-tasking operating system is the UNIX® operating system or a derivative thereof.

The FPTA 10 provides feedback to the designer about particular failing paths or nets, i.e., paths or nets which do not meet the specified timing constraints, and enables the designer to relate the non-graphical timing constraints of the IC to the graphical layout of the IC. The designer is enabled to see in a graphical display the failing paths or nets and thus gain an intuitive visual feel for the geometrical placement changes which must be made to remedy the timing violations of a given floorplan choice. Thus, the FPTA 10 provides an improved method for aiding an experienced floorplan designer in designing an IC floorplan over existing methods which provide only scalar numerical grade feedback.

The feedback includes spreadsheets of timing information about the paths and nets of the IC and histograms which provide a visual summary of the timing information. The spreadsheets are hyperlinked to graphical displays of IC portions, enabling the designer to specify particular paths or nets to graphically display.

The constraints database 16 includes timing constraint information of the integrated circuit. The timing constraint information comprises driven at times and needed by times for terminals of the logical blocks of the integrated circuit. The driven at times specify the amount of time after the beginning of a clock cycle at which a source terminal drives a valid logic level signal out of the source terminal. A needed by time specifies the amount of time before the end of a clock cycle at which a valid logic level signal must be received by a destination terminal. Some of the terminals of the integrated circuit are input/output terminals. For input/output terminals, both a driven at and needed by timing constraint are included. The timing constraints are provided, typically, by the logic designers of the integrated circuit.

In one embodiment of the present invention, the constraints database 16 is received by the FPTA 10 and the FPTA 10 generates a mapped constraints database 18, which is also received by the FPTA 10. The mapped constraints database 18 also contains timing constraint information similar to the constraints database 16, however, the mapped constraints database 16 takes into account the hierarchical nature of the design of the integrated circuit. More details of the mapped constraints database 18 will be discussed with reference to FIG. 7 and its related figures.

The net properties database 19 includes information about properties of the nets of the integrated circuit. The net property information is used for the purpose, inter alia, of calculating net delays. In particular, each net is described in terms of a net routing class, which is used in the calculation of net delays. The FPTA 10 receives the net property information from the net properties database 19 in order to calculate the net delays. An "ignore" property may also be specified for a given net in the net properties database 19. The "ignore" property instructs the FPTA 10 to exclude the given net from timing analysis in the event that the given net was in the set of selected nets.

The design database 20 includes information about the design of the integrated circuit. The design information includes specifications about the logical blocks that make up the integrated circuit. In addition, the design information includes a netlist of the integrated circuit. The netlist specifies the interconnections of the various terminals of the logical blocks of the integrated circuit. The netlist describes the interconnection of the terminals to the logical blocks at a logical level rather than at a physical level; that is, the netlist simply describes which terminals are to be connected to which terminals but not the physical paths or routes by which those terminals must be connected. The physical paths or routes by which the terminals are connected is determined by the floorplan design of the integrated circuit.

Once the floorplan designer chooses a floorplan for the logical blocks of the integrated circuit, that is, the physical locations at which the logical blocks of the integrated circuits will be placed, the floorplan design information, chosen by the floorplan designer, is also entered into the design database 20.

The FPTA 10 comprises a collection of interoperating computer programs. Preferably, the computer programs are written in the LISP computer language and the PERL scripts language. The FPTA 10 provides a graphical user interface to the IC designer in a form menu from which selections may be made to perform various operations as shown in the screen shot of FIG. 4. The operations associated with each of the menu selection buttons will be described in detail with reference to FIG. 7 and its related figures. Preferably, the FPTA 10 employs the GALAXY® Visual Resource Environment graphical user interface tools from Visix Software, Inc. and ALLEGRO® Common Lisp from Franz, Inc.

The FPTA 10 communicates with the chip floorplan editor 14 to perform various actions required to perform the timing analysis of the integrated circuit and to provide the feedback of the timing quality of the integrated circuit to the floorplan designer to aid the floorplan designer in the design of the integrated circuit. The chip floorplan editor 14 accesses the design database 20 in order to obtain design information to perform the actions requested by the FTPA 10. Further details of the actions requested by the FPTA 10 of the chip floorplan editor 14 are discussed with reference to FIG. 7.

The chip floorplan editor 14 comprises computer programs which enable an IC designer to place the logical blocks of the IC, in a graphical manner, in physical locations. The chip floorplan editor 14 further provides the ability to route the nets of the IC according to the design database 20 specifications. The chip floorplan editor 14 comprises means for graphically displaying the floorplan block placement and terminal location of the IC. The chip floorplan editor 14 comprises means for accessing the design information in the design database 20. The FPTA 10 interfaces with the database access means of the chip floorplan editor 14.

Figure 5:
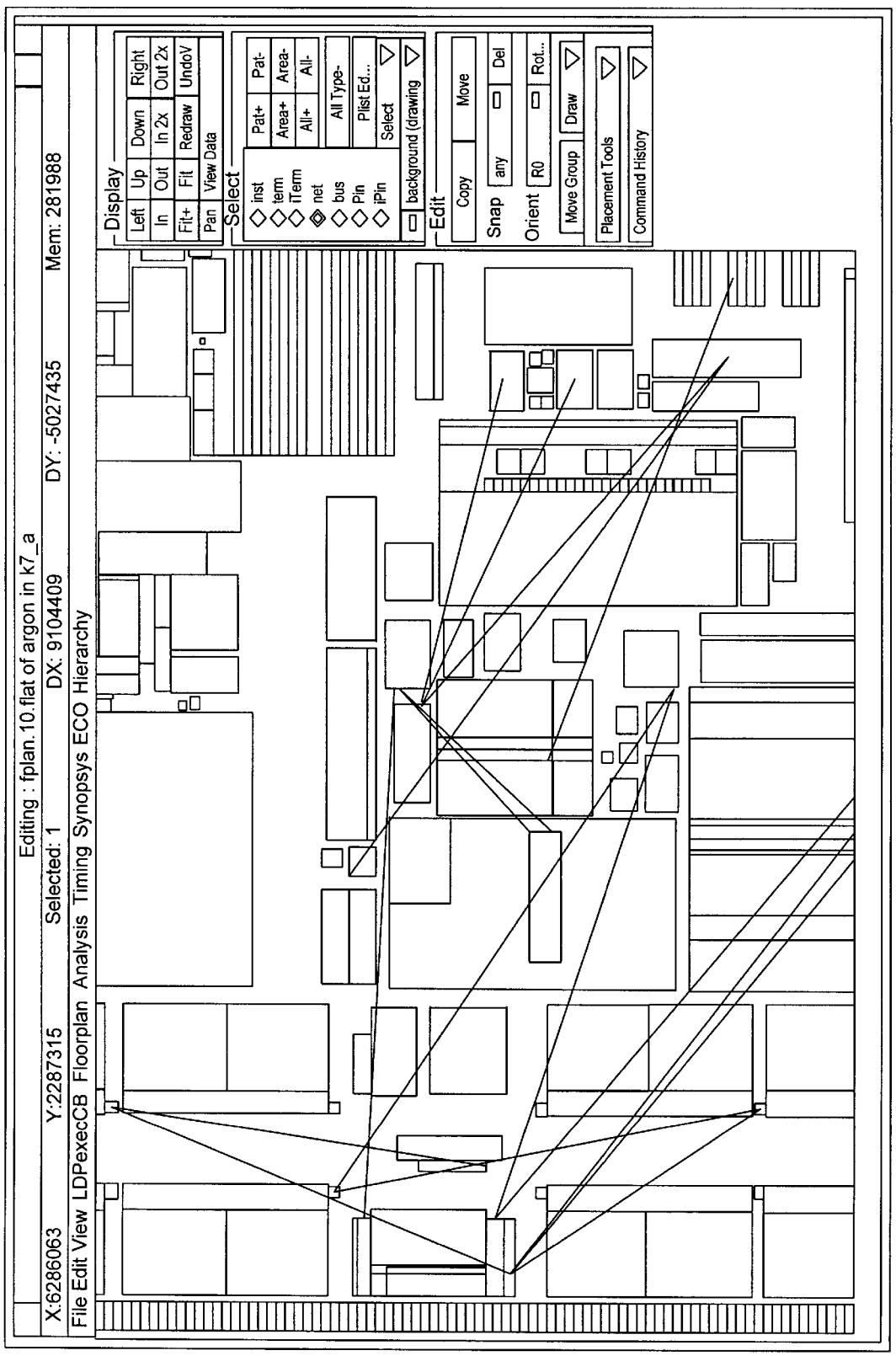
FIG. 5 is a screen shot from the chip floorplan editor of FIG. 3.

Preferably, the chip floorplan editor 14 comprises the DESIGN PLANNER® (DP3) product from High Level Design Systems, Inc. FIG. 5 shows a screen shot of a floorplan displayed in a cell view of the DP product. The integrated circuit floorplan displayed is a copyrighted work 1996 by Advanced Micro Devices, Inc.

The chip floorplan editor 14 shown in FIG. 5 comprises menus which enable a user to select a logical block, terminal, and/or net. The selected nets and/or nets associated with a selected logical block or terminal may then be displayed. Further, blocks or nets may be selected by the user as the set of nets to be operated upon by operations of the FPTA 10 as will be described with reference to FIG. 7.

After performing timing analysis of the integrated circuit specified by the constraints database 16 and the design database 20, the FPTA 10 generates spreadsheet data 22, which is received by a spreadsheet engine 12. The spreadsheet data 22 includes a list of paths or nets of the integrated circuit with associated timing information for each path or net. The timing information includes, inter alia, timing constraint information and net delay information for each path or net.

The spreadsheet engine 12 displays the spreadsheet data 22 on the computer display screen. The displayed spreadsheet data 22 provides feedback on the "timing quality" of a given floorplanning alternative to aid the floorplan designer in floorplanning the logical blocks of the IC in a manner which meets the timing constraints specified in the constraints database 16 and the mapped constraints database 18. The spreadsheet data 22 includes information used to compute hyperlinks from the spreadsheet data for a particular path or net, to a graphical display of the path or net on a graphical display of the physical layout of the IC.

The hyperlinks enable the floorplan designer to relate the displayed spreadsheet data 22 to a graphical view of the floorplan. The FPTA 10 receives information specifying a set of nets or paths from the hyperlinks file 24 and instructs the chip floorplan editor 14 to display the nets or paths specified in the hyperlinks file 24.

The spreadsheet engine 12 also summarizes the spreadsheet data 22 and displays the information in a histogram to give the floorplan designer an indication of the relative timing quality of a given floorplan.

Figure 6:
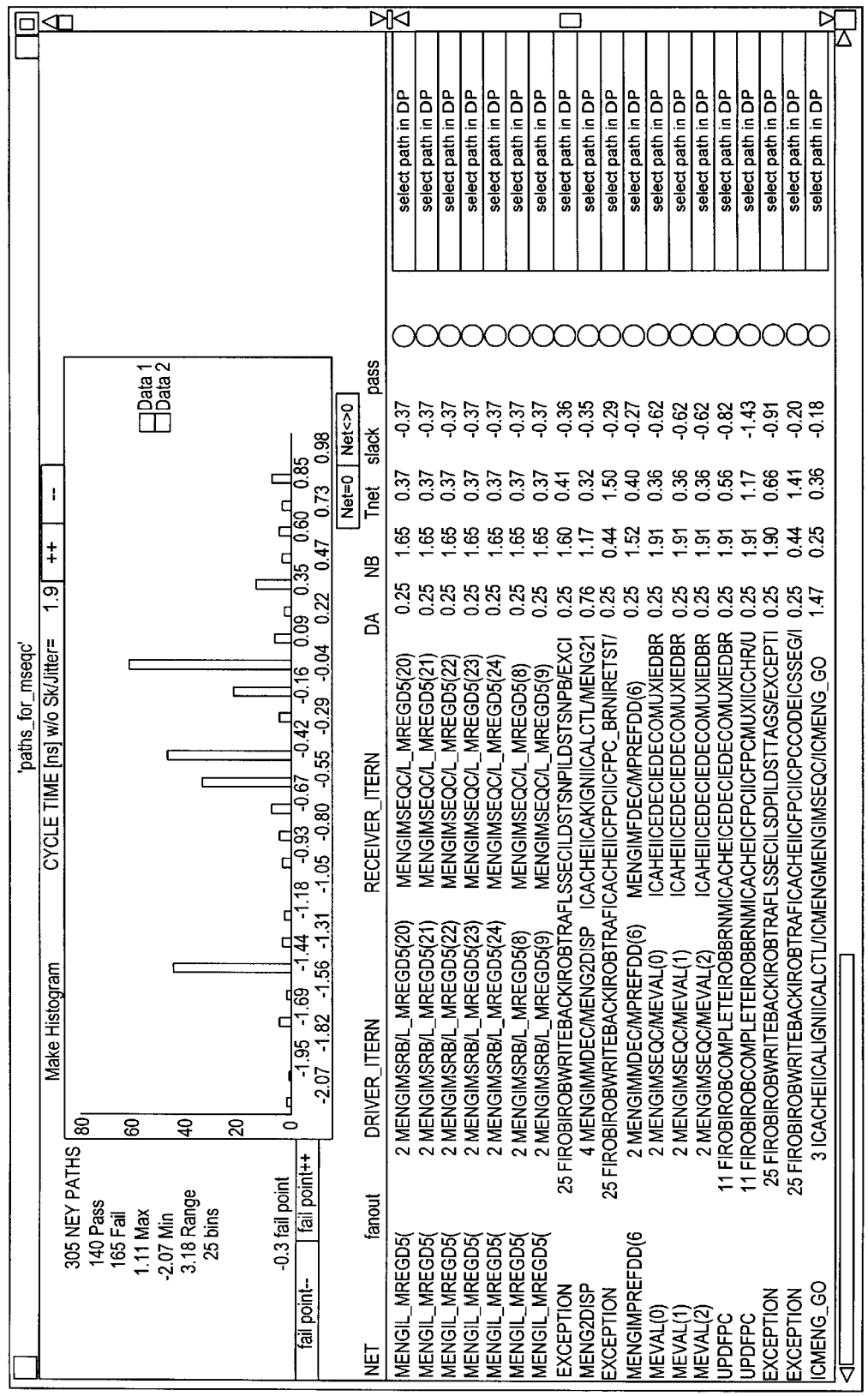
FIG. 6 is a screen shot from the spreadsheet engine of FIG. 3.

The spreadsheet engine 12 comprises a computer program configured to provide functionality common to most spreadsheet programs. In particular, the spreadsheet engine 12 manipulates inputted numerical and string data in rows and columns of cells. The value in a cell is calculated from a formula which can involve other cells. A value is recalculated whenever a value on which it depends changes. Different cells may be printed with different formats, including graphics mode widgets, such as buttons. Preferably, the spreadsheet engine 12 comprises the Decision Support System (DSS) tool from Mentor Graphics Corporation. FIG. 6 shows a screen shot of a DSS spreadsheet and histogram, displaying feedback information related to the floorplan of FIG. 5.

Thus, in a typical design scenario employing the method of present invention, a logic designer designs logical blocks of an integrated circuit including a functional description of the logical blocks and a netlist defining the logical connections between the terminals of the logical blocks. The logic designer further provides timing constraints of the various signals for the terminals of the integrated circuit. A floorplan designer uses the netlist and chooses a physical layout of the integrated circuit, i.e., a floorplan. The floorplan designer uses the FPTA 10 to obtain multi-dimensional feedback regarding the timing quality of the chosen floorplan based on a given route of the nets according to the netlist specification. The floorplan designer uses the FPTA 10 feedback to make changes to the floorplan to choose an improved floorplan. The floorplan editor may perform multiple iterations of the floorplan design, routing and obtaining feedback from the FPTA 10 until a suitable floorplan is obtained.

Figure 4:
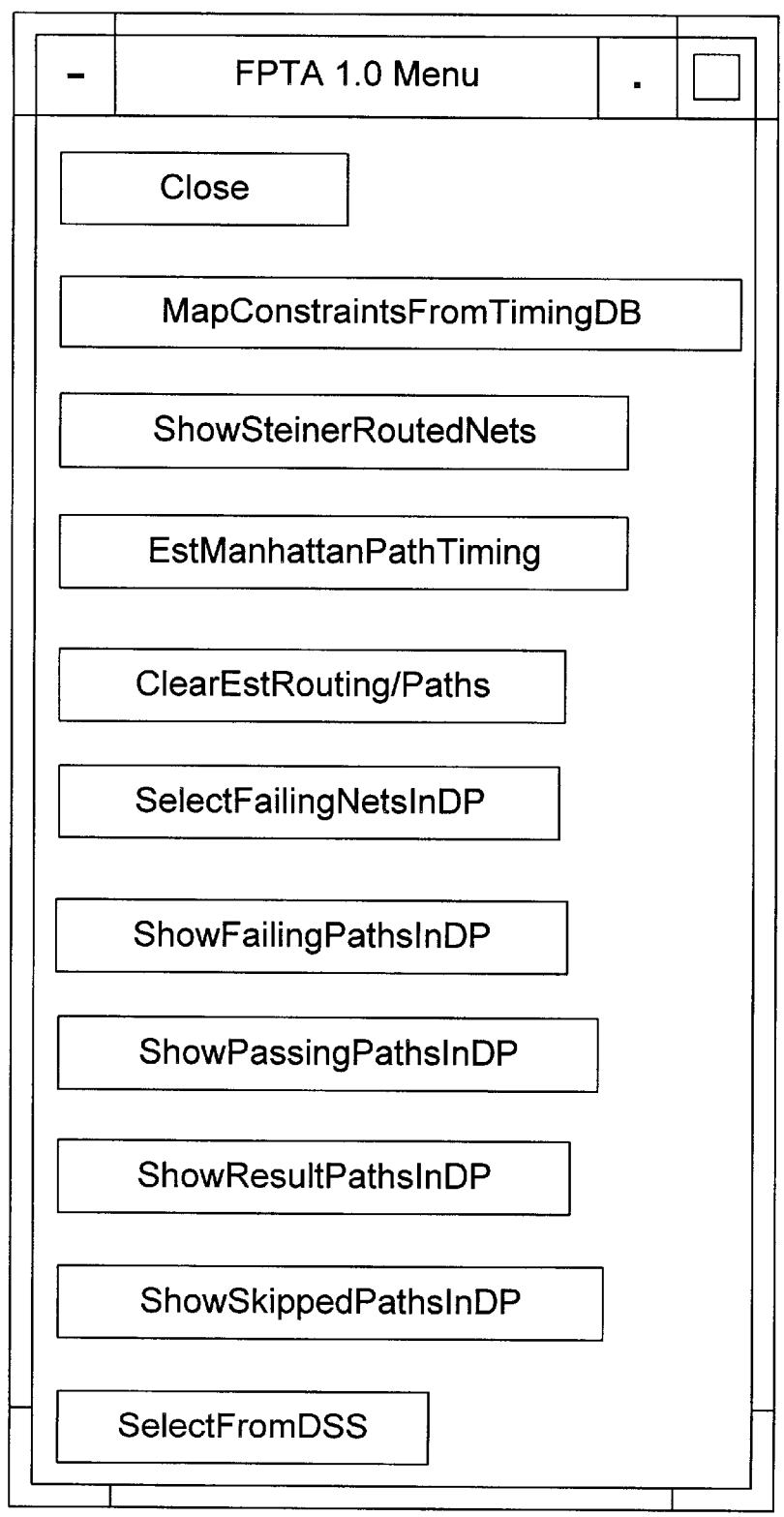
FIG. 4 is a screen shot of the main menu of the FPTA of FIG. 3.
Figure 7:
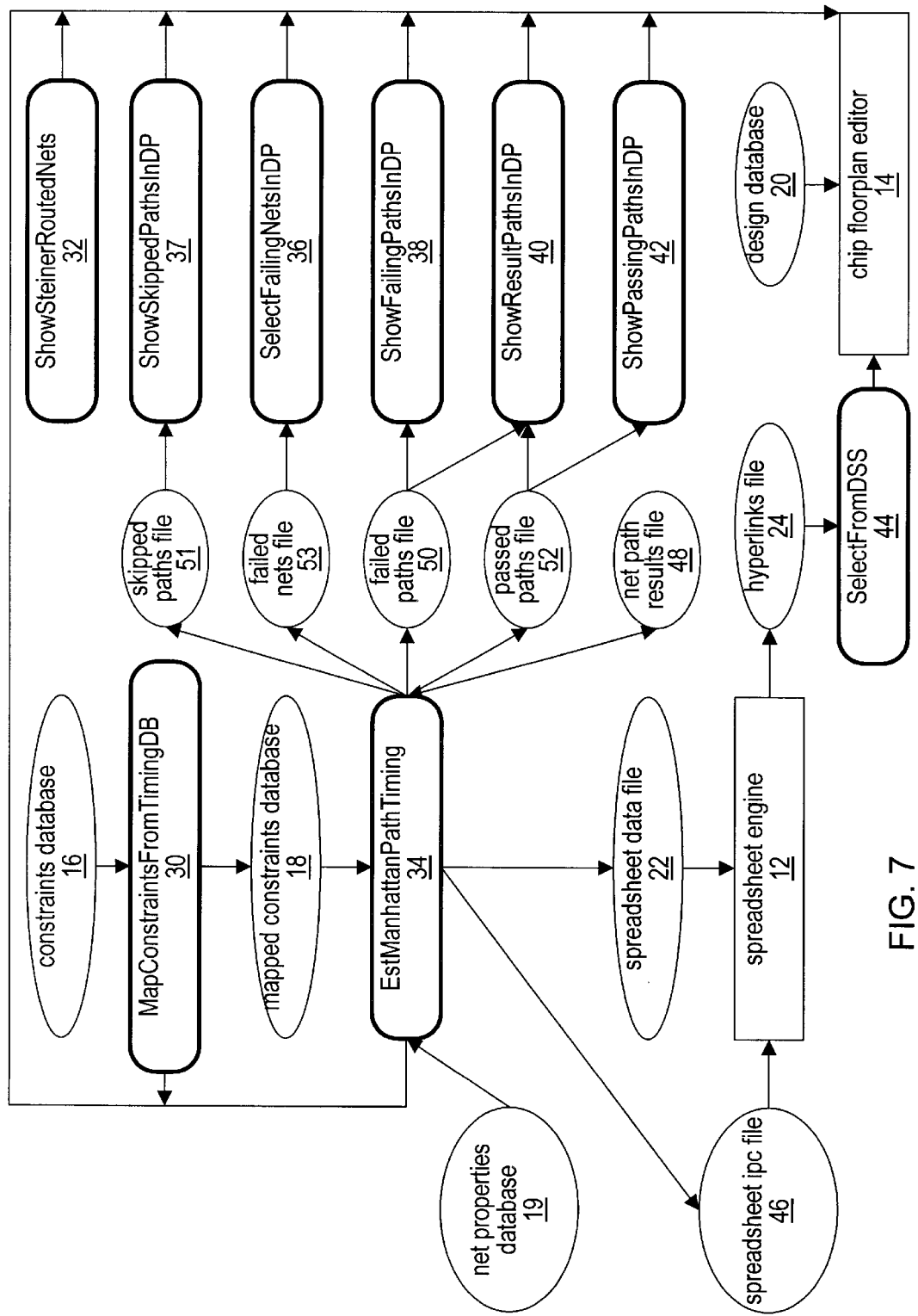
FIG. 7 is a block diagram illustrating relationships between elements of the block diagram of FIG. 3 and the menu choices of FIG. 4.

Referring now to FIG. 7, a block diagram illustrating relationships between elements of the block diagram of FIG. 3 and the menu choices of FIG. 4 is shown. Each of the thick-lined, rounded-corner boxes shown in FIG. 7, namely MapConstraintsFromTimingDB 30, ShowSteinerRoutedNets 32, EstManhattanPathTiming 34, ShowSkippedPathsInDP 37, SelectFailingNetsInDP 36, ShowFailingPathsInDP 38, ShowPassingPathsInDP 42, ShowResultPathsInDP 40, and SelectFromDSS 44, correspond to the similarly named menu buttons on the FPTA form menu shown in FIG. 4 and represent operations performed by the FPTA 10 and correspond to code portions of the FPTA 10.

When a user selects a menu button of FIG. 4 by clicking on the button with a mouse, a "callback" function within the FPTA 10 code is invoked which services the mouse click event. A plurality of callback functions exists within the FPTA 10 code. The appropriate callback function is invoked corresponding to the particular function pressed. The callback function performs, or makes calls to other functions or programs to perform, the requested operation corresponding to the selected button.

A brief description of each of the FPTA 10 operations shown in FIG. 7 will be given here. However, along with the brief description, references are given to corresponding other Figs. providing flowcharts and/or screen shots with more detailed descriptions.

The FPTA 10 performs the EstManhattanPathTiming operation 34 in response to a user selecting the EstManhattanPathTiming button from the FPTA 10 main menu of FIG. 4. Prior to selecting the EstManhattanPathTiming operation 34, the user selects a set of nets or blocks of the integrated circuit using the chip floorplan editor 14. For example, the user might select a particular block to analyze by clicking on the block with the mouse. The EstManhattanPathTiming operation 34 will perform a timing analysis of all nets associated with, i.e., connected to, the block selected by the user. The user may also explicitly select one or more nets to be analyzed. The nets associated with the selected block or blocks and/or the explicitly selected nets together make up the set of selected nets.

The FPTA 10 performs the EstManhattanPathTiming operation 34 by calculating a net delay for each path corresponding to the set of selected nets, using the calculated net delay and timing constraints associated with each path to calculate a slack time for each path, and generating report files and spreadsheet data in order to provide timing quality feedback to the floorplan designer. The EstManhattanPathTiming operation 34 receives information from the mapped constraints database 18, net properties database 19, and design database 20 in order to perform the net delay calculation, slack time calculation, and report file generation. A more detailed description of the EstManhattanPathTiming operation 34 is given with reference to the flow chart in FIG. 8 along with accompanying or related flow charts in FIGS. 9a, 9b, 10 and 11a.

Preferably, the EstManhattanPathTiming operation 34 generates the spreadsheet data to a spreadsheet data file 22. The FPTA 10 communicates with the spreadsheet engine 12 informing the spreadsheet engine 12 that spreadsheet data exists to be displayed in a spreadsheet and selectively in a histogram in response to user input.

Preferably, the FPTA 10 communicates with the spreadsheet engine 12 by means of an inter-process communication (IPC) file 46. Preferably, the spreadsheet engine 12 periodically reads the spreadsheet IPC file 46 to determine whether or not actions are to be performed by the spreadsheet engine 12 in response to the FPTA 10. In particular, the FPTA 10 outputs information to the spreadsheet IPC file 46 to inform the spreadsheet engine 12 that spreadsheet data exists in the spreadsheet data file 22 which the spreadsheet engine 12 is to display in the spreadsheet and/or selectively in the histogram. The EstManhattanPathTiming operation 34 generates report files, in particular, the net path results file 48, the failed paths file 50, the skipped paths file 51, the passed paths file 52, and the failed nets file 53. These report files are used by the EstManhattanPathTiming operation 34 itself along with other operations of the FPTA 10. Preferably, the various operations of the FPTA 10 communicate filename information, such as report file names, among one another via environment variables facilitated by the operating system, such as UNIX environment variables.

Preferably, the FPTA 10 maintains an in-memory copy of the information contained in each of the report files as well as the mapped constraints database 18. The FPTA 10 keeps a list in memory of the same information, i.e., the paths or nets or mapped timing constraints, contained in the files. When a report file or the mapped constraints database 18 is accessed, the FPTA 10 creates or updates, as appropriate, the in-memory copies. Thus, the in-memory copies function as caches to improve the performance of the FPTA 10.

The spreadsheet engine 12 receives the spreadsheet data from the spreadsheet data file 22 and displays the timing quality feedback information as shown in FIG. 6. The floorplan designer uses the feedback displayed in the spreadsheet to determine changes which need to be made in the floorplan. The designer uses the feedback information to detect problem nets, i.e., nets which fail to meet the timing constraints specified.

For example, the pass button shown in FIG. 6 is illuminated with a color, preferably green for passing and red for failing, indicating whether or not a specified net passes or fails the slack time criteria. The designer may choose to graphically relate a failing net indicated by a red pass button in the spreadsheet by selecting the hyperlink button labeled "select path in DP" associated with the failing net. When the user clicks on the "select path in DP" button of the spreadsheet, the spreadsheet generates hyperlink information to the hyperlinks file 24.

Preferably, the hyperlink information resides in a file 24 and includes information which may be used by the FPTA 10 to communicate with the chip floorplan editor 14 to display the path selected in a graphical view of the floorplan. The floorplan designer may click on multiple of the hyperlink buttons and generate multiple hyperlinks to the hyperlink file 24. The designer then clicks on the SelectFromDSS button in the FPTA 10 main menu to invoke the SelectFromDSS operation 44.

The SelectFromDSS operation 44 uses the hyperlinks file 24 to instruct the chip floorplan editor 14 to display the selected paths indicated in the hyperlinks file 24. More detail on the SelectFromDSS operation 44 will be given with reference to FIGS. 12a and 12b.

After performing the EstManhattanPathTiming operation 34, the user may also perform other FPTA 10 operations in order to determine the timing quality of the floorplan design. Other operations include the SelectFailingNetsInDP operation 36, the ShowSkippedPathsInDP operation 37, the ShowFailingPathsInDP operation 38, the ShowResultPathsInDP operation 40, and the ShowPassingPathsInDP operation 42. Each of these operations instruct the chip floorplan editor 14 to display various paths or nets on the chip floorplan cell view an example of which is shown in FIG. 5. As is evident from the names of the operations, failing paths or net, that is paths or nets which failed to meet the specified timing constraints may be displayed, as well as paths or nets which meet the specified timing constraints. Additionally, all selected paths or nets may be displayed.

Figure 13A:
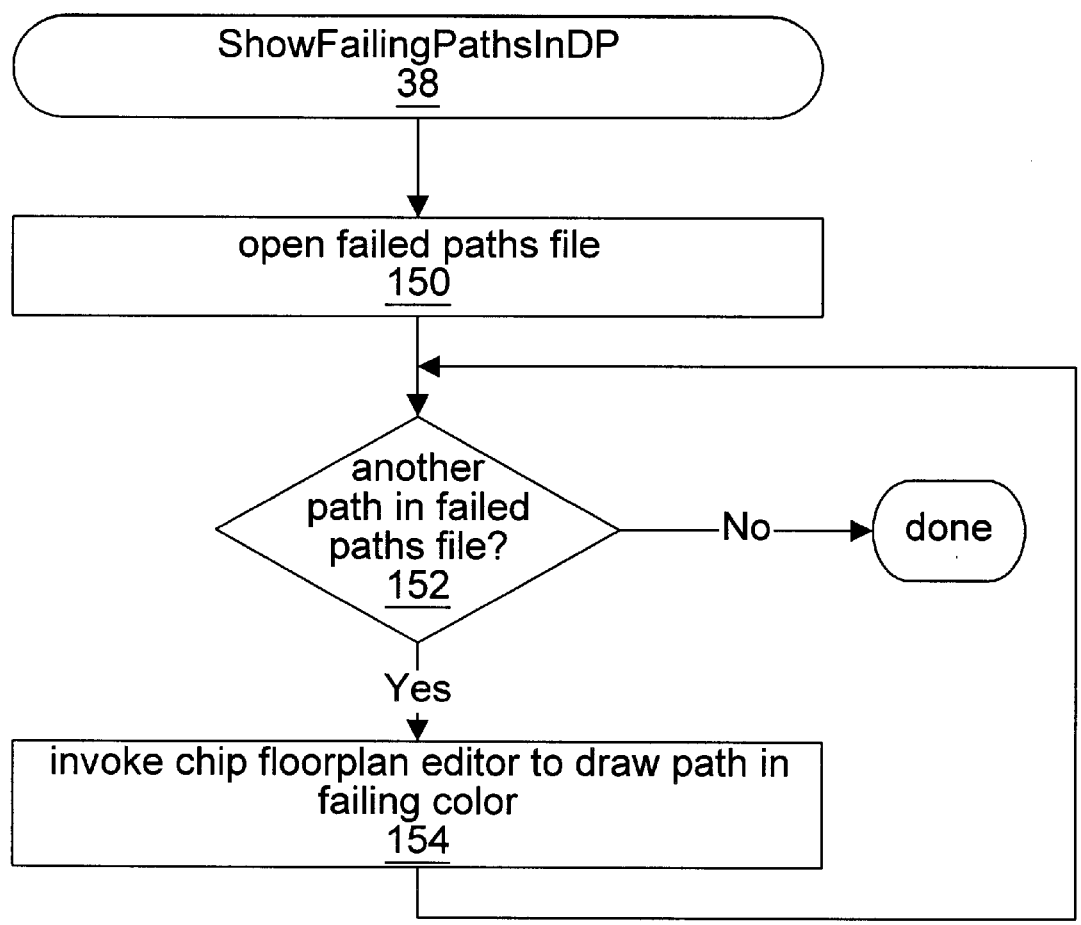
FIG. 13a is a flowchart illustrating steps performed in response to the "ShowFailingPathsInDP" menu selection of FIG. 4.
Figure 13B:
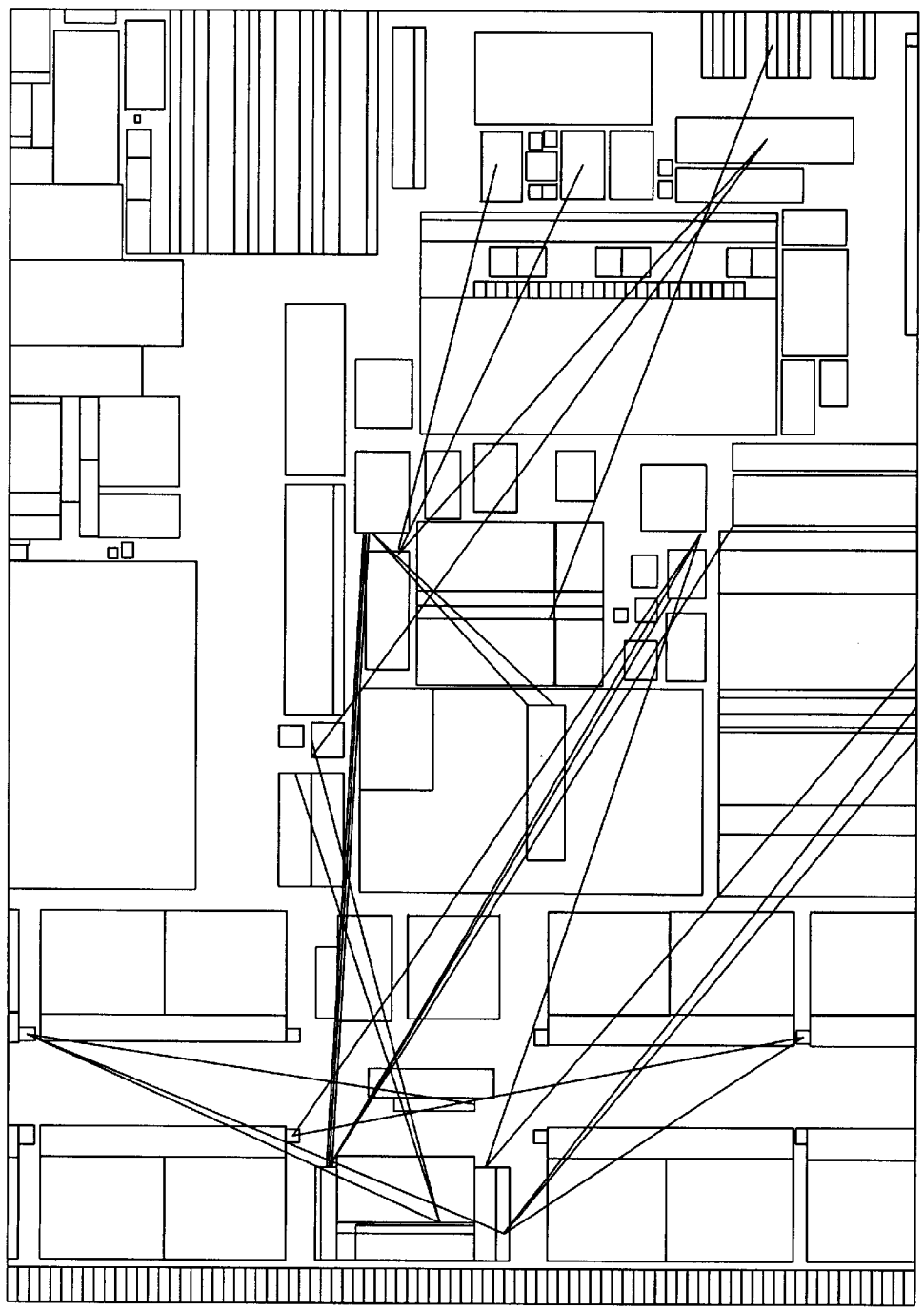

More details on the ShowFailingPathsInDP operation 38 are given with reference to FIGS. 13a and 13b. More details on the ShowPassingPathsInDP operation 42 are given with respect to FIGS. 14a and 14b. More detail on the ShowResultPathsInDP operation 40 are given with respect to FIGS. 15a and 15b. More detail on the ShowSkippedPathsInDP operation 37 are given with respect to FIGS. 16a and 16b. More detail on the SelectFailingNetsInDP operation 36 are given with respect to FIGS. 17a and 17b.

Typically, an integrated circuit design comprises high level logical blocks which are interconnected by nets. Each high level block further comprises lower level blocks. The lower level blocks in turn comprise yet lower level blocks and the hierarchy continues down till reaching the level of gates and/or transistors.

The timing constraints specified in the constraints database 16 are specified at a relatively low level such as at a gate level. Preferably, the timing constraints specified in the constraints database 16 are at the level of the Register Transfer Level (RTL) language. However, the EstManhattanPath timing operation 34 may be requested by a designer to be performed at a much higher level in the design of the hierarchy, i.e., a user may select a net to be analyzed which connects terminals of blocks at a higher level than is specified in the constraints database 16. Hence, the low level timing constraints specified in the constraints database 16 must be mapped to a higher level of timing constraints associated with the terminals of the logical blocks at the higher level at which the path timing analysis is requested.

The mapped timing constraints for the higher level logical blocks are contained in the mapped constraints database 18 which is generated by the MapConstraintsFromTimingDB operation 30. The MapConstraintsFromTimingDB operation 30 performs a recursive depth-first search through the design hierarchy to "flatten" the hierarchy with regard to timing constraints. Preferably an in-memory copy of the mapped constraints database 18, in a manner similar to the in-memory copies of the report files, is kept to improve the performance of accesses to the mapped constraints database 18.

It is useful for a floorplan designer to view the theoretical "best case" routing which could be performed disregarding electrical or physical constraints such as if nets could all be routed on top of each other, i.e., creating short circuit situations. Such a best case routing is commonly referred to as a Steiner routing. The ShowSteinerRoutedNets operation 32 displays a Steiner route for the selected portion of the integrated circuit. The reader is referred to FIGS. 18a and 18b for a more detailed explanation of the ShowSteinerRoutedNets operation 32.

As previously mentioned, one of the functions of the spreadsheet engine 12 is to display a summary histogram of the timing information displayed in the spreadsheet as shown in FIG. 6. The reader is referred to FIG. 19 for a detailed description of the process of making the histogram.

EstManhattanPathTiming

Figure 8:
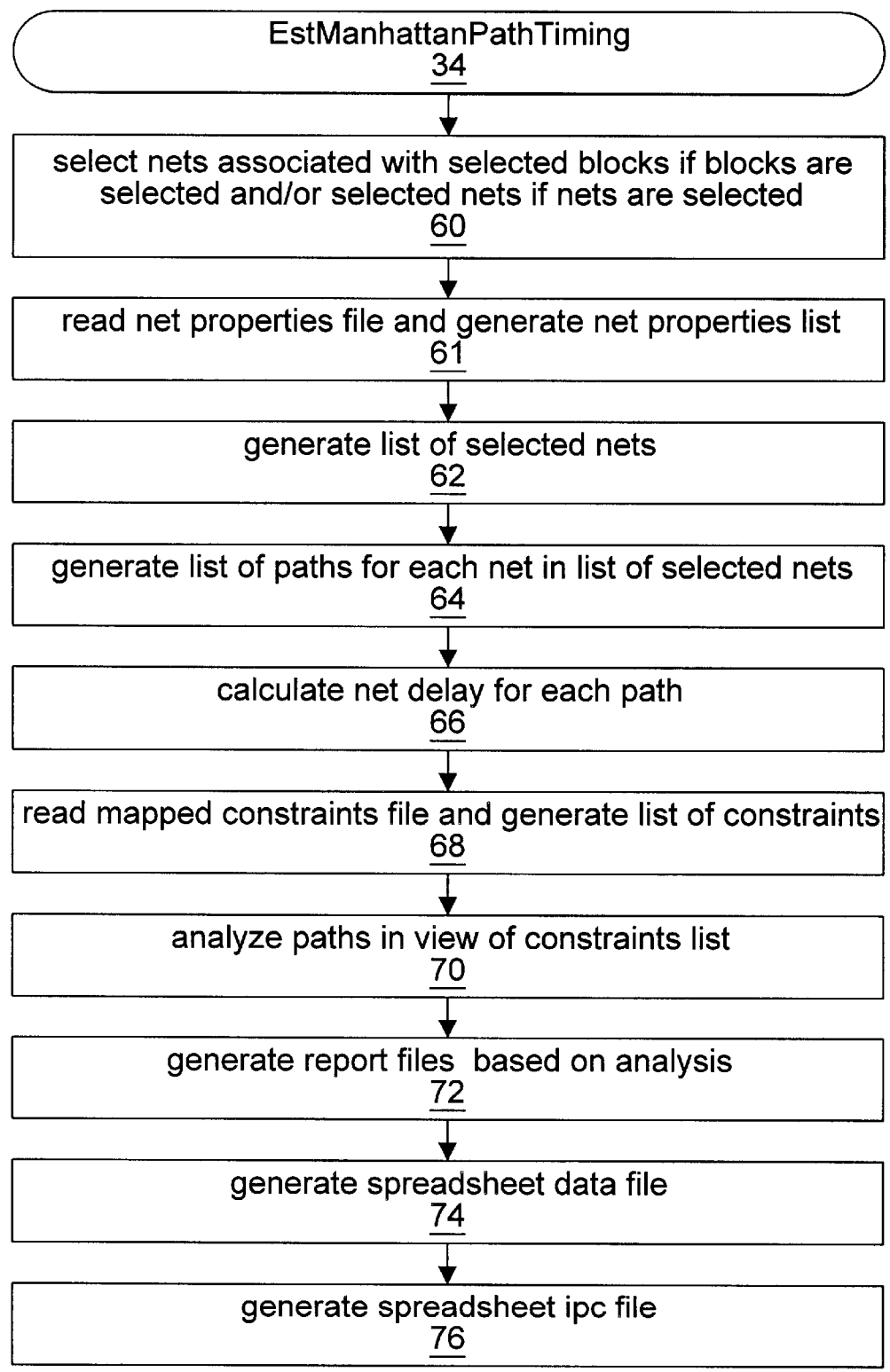
FIG. 8 is a flowchart illustrating steps performed in response to the "EstManhattanPathTiming" menu selection of FIG. 4.

Referring now to FIG. 8, a flowchart illustrating steps taken in performing the EstManhattanPathTiming operation 34 is shown. Prior to selecting the EstManhattanPathTiming operation 34 the user selects one or more nets of the integrated circuit for which he or she desires the FPTA 10 to perform timing analysis. The user selects the nets for which timing analysis is to be performed by using the chip floorplan editor, preferably using the menus as shown in FIG. 5. The user selects nets either by selecting a logical block, thus selecting all nets connected to that logical block, or by selecting individual nets explicitly, or by selecting specific terminals and thereby selecting all nets connected to the selected terminals. The EstManhattanPathTiming operation 34 queries the chip floorplan editor 14 for information regarding which nets were selected by the user.

In step 60, the EstManhattanPathTiming operation 34 queries the chip floorplan editor 14 for any blocks and/or nets which have been selected by the user. If one or more blocks have been selected by the user, the operation 34 instructs the chip floorplan editor 14 to select the list of nets connected to the selected blocks, thereby adding the nets connected to the selected blocks to the list of nets explicitly selected by the user. The operation 34 queries the chip floorplan editor 14 for the list of selected nets.

Next, the operation 34 reads the net properties file 19 and generates a net properties list in step 61. The net properties list contains net properties for each of the nets in the list of selected nets, in particular the net routing class and "ignore" properties.

The EstManhattanPathTiming operation 34 then generates, in step 62, a list of all selected nets by the user. If the net property list indicates an "ignore" property for a given list in the set of selected nets, the given net is not included in the list of selected nets generated. As previously mentioned, a net comprises two or more terminals and the connections between those terminals. A path comprises two terminals, a source terminal and a destination terminal connected together. Hence, a given net may comprise a plurality of paths.

Next, in step 64, a list of paths is generated for each net in the list of selected nets. The design database 20 specifies, for each terminal, whether the terminal is a source terminal, a destination terminal or an input/output terminal, i.e., a source/destination terminal. The list of paths for each net is generated by traversing the list of nets and for each net finding each of the source terminals associated with that net. For a given source terminal the list of terminals for the given net is traversed and each destination terminal is in turn paired with the given source terminal in order to form the list of paths for each net in the list of nets. Once the list of paths has been generated for the selected set of nets the EstManhattanPathTiming operation 34 calculates an associated net delay for each path in step 66. The net delay is an estimate of the amount of time required for a signal to travel from the source terminal to the destination terminal. The net delay is dependent upon the length of the path from the source terminal to the destination terminal. The reader is referred to FIGS. 9a and 9b for a more detailed explanation of steps involved in calculating the net delay for each path.

Once the net delays have been calculated for each of those paths associated with the selected nets, the EstManhattanPathTiming operation 34 reads the mapped constraints database 18, or in-memory copy if present, to determine the needed by and driven at timing constraints for each of the terminals associated with the list of paths and generates a list of such timing constraints in step 68.

The list of timing constraints is then analyzed in view of the calculated net delays in step 70. The analysis comprises calculating slack times for each path and determining if the slack times are greater than a slack failure value specified by the user. Slack times which are less than the specified slack failure value are deemed failing nets whereas paths whose select times are greater than the specified slack failure value are deemed passing paths.

As each path is analyzed in view of the timing constraints, the operation 34 to generates report files based on the analysis in step 72. The report files comprise the net path results file 48, the failed paths file 50, the skipped paths file 51, the passed paths file 52, and the failed nets file 53, all of FIG. 7. The passed paths file 52 contains specifications of each path which has a passing slack time. Conversely, the failed paths file 50 contains information specifying paths whose select time was less than the specified slack failure value. The skipped paths file 51 contains specifications of each path which was skipped in timing analysis due to the absence of timing constraints for the path terminals. The failed nets file 53 contains information specifying nets comprising one or more failed paths. The net path results file 48 comprises information specifying all paths analyzed in step 70. The reader is referred to FIG. 10 for more detailed explanation of the generation of the report files based on the analysis in step 72.

The operation 34 then generates the spreadsheet data file in step 74 containing spreadsheet data comprising timing information, in particular, net names, source and destination terminal names, fanout, timing constraints, net delays, delay per unit length, path length, source and destination terminal physical placement locations, and hyperlink commands. The reader is referred to FIG. 11 for a more detailed explanation of the generation of the spreadsheet data.

Lastly, the operation 34 communicates with the spreadsheet engine 12 to instruct the spreadsheet engine 12 that spreadsheet data exists to be displayed on the spreadsheet in step 76. Preferably, the operation 34 communicates with the spreadsheet engine 12 via an inter-process communication means. One embodiment, the inter-process communication (IPC) means comprises the spreadsheet IPC file 46, which contains commands generated by the operation 34 instructing the spreadsheet engine 12 to display spreadsheet data contained in the spreadsheet data file 22.

Preferably, the spreadsheet engine 12 periodically reads the spreadsheet IPC file 46 to determine if spreadsheet data exists to be displayed in the spreadsheet engine by the spreadsheet engine 12. Thus, a designer advantageously employs the EstManhattanPathTiming operation 34 in order to obtain multi-dimensional feedback regarding the timing quality of a particular floorplan for a particular portion of the floorplan, i.e., for selected logical blocks and/or nets of the integrated circuit.

Figure 9A:
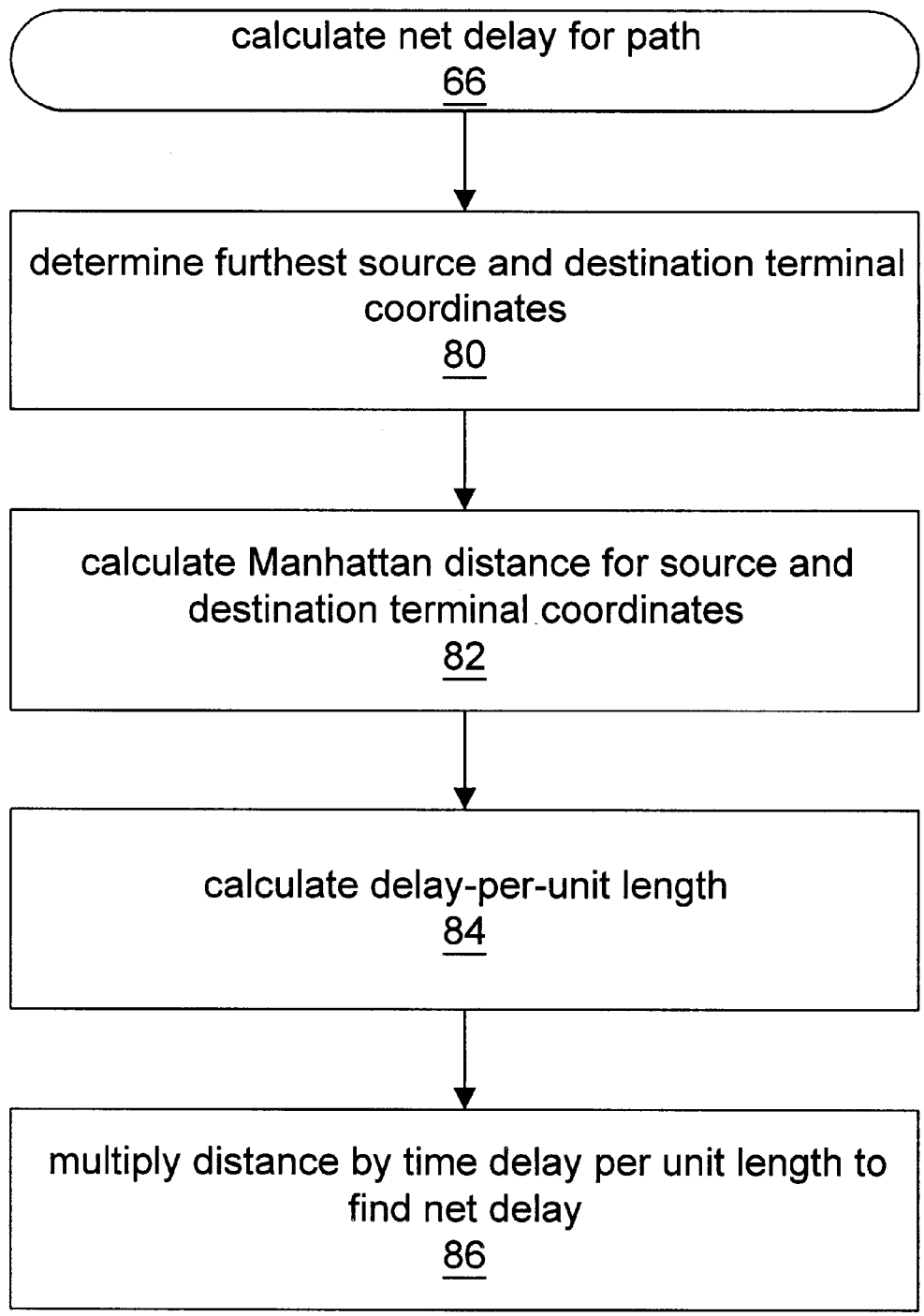
FIG. 9a is a flowchart illustrating detailed steps taken to perform the step of calculating net delays for paths of FIG. 8.

Referring now to FIG. 9a, a flowchart illustrating steps taken to calculate net delays for each path in step 66 of FIG. 8 are shown. In one embodiment, the net delay is calculated for a path based on a Manhattan path. A Manhattan path is defined as a rectilinear path from the source terminal to the destination terminal. That is, the path is defined by two intersecting lines, a horizontal line and a vertical line. The horizontal line emanates from a first terminal toward a second terminal and the vertical line emanates from the second terminal towards the first terminal until the horizontal and vertical lines intersect.

A terminal of a circuit element is a logical entity. The terminal comprises one or more physical pins. The pins are a function of the location and orientation of the contact regions (pins) of a device to which an interconnect (i.e., path) from another device can be routed/connected. Since nets are actually routed from pins, the particular coordinate, or location, of a pin on a given terminal to be routed from must be determined.

In step 80, the coordinates of a pin coordinates associated with the source and destination terminals which are farthest away from each other are determined. The furthest coordinates are determined in order to generate the longest possible path for a given path in calculating the net delay for the path in order to give a more conservative estimate of the net delay for the path.

Figure 9B:
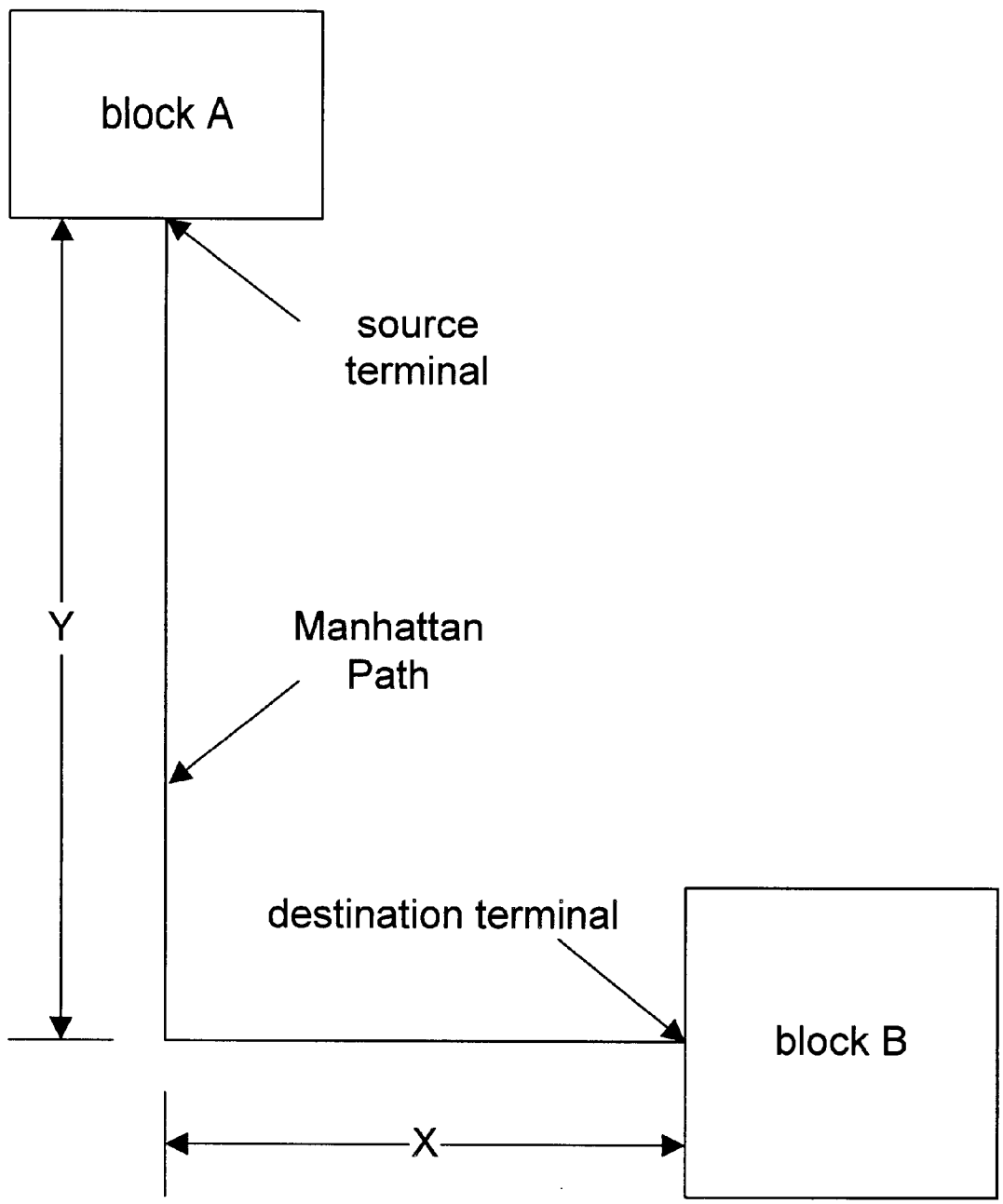
FIG. 9b is a diagram illustrating the calculation of Manhattan Path Distance calculation.

Once the rectilinear coordinates of the source and destination terminals are determined, the Manhattan distance is calculated for the source and destination terminal coordinates in step 82. The Manhattan distance is calculated by adding the length of the horizontal line and the vertical line which comprise the Manhattan path. That is, the length of the horizontal line from one terminal to the intersection of the horizontal and vertical lines added to the length of the vertical line from the other terminal to the intersection of the horizontal and vertical lines. FIG. 9b illustrates a Manhattan path and the calculation of a Manhattan path distance.

The operation 66 calculates the delay per unit length of the path in step 84. Preferably, the delay per unit length is a function of the length of the path and a function of the net properties of the net comprising the path as specified in the net properties database 19 of FIG. 7.

Once the Manhattan distance and delay per unit length are calculated, the distance is multiplied by a time delay per unit length in order to calculate the net delay in step 86. Although the Manhattan path is unlikely to be the actual path routed in the actual implementation of the integrated circuit it has been found that the estimated Manhattan path net delay for a given path gives a reasonable and valuable estimate of the net delay for a given path. Such an estimate has been found valuable in determining the timing quality of a given floorplan for an integrated circuit. As previously mentioned, as integrated circuit geometries become smaller, the net delays associated with the propagation of signals through paths from source terminals to destination terminals becomes increasingly crucial in analyzing the timing quality of a given floorplan.

Figure 10:
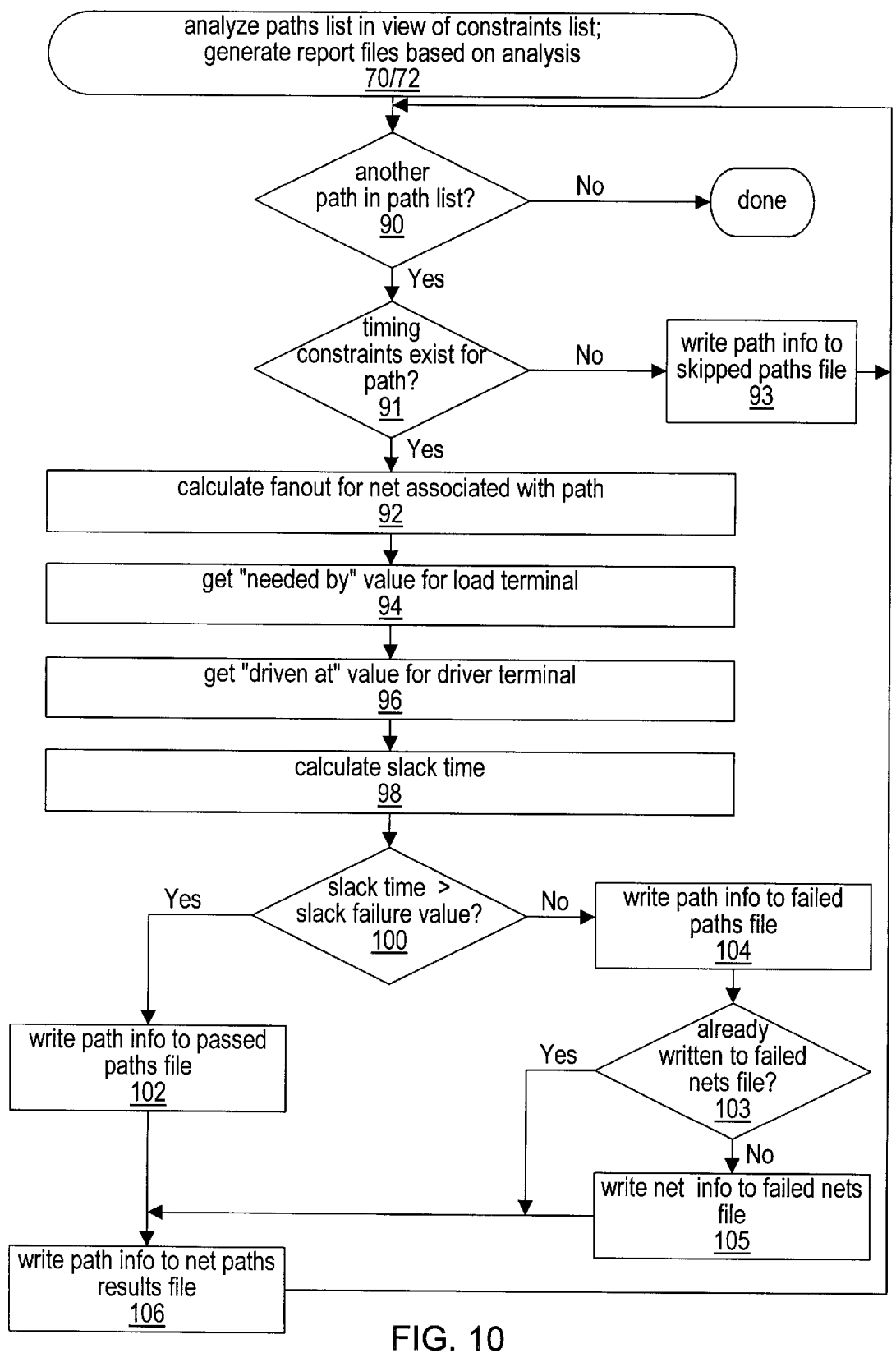
FIG. 10 is a flowchart illustrating detailed steps taken to perform the steps of analyzing the paths in view of the constraints list and generating report files based on the analysis of FIG. 8.

Referring now to FIG. 10, a flowchart illustrating detailed steps taken to perform steps 70 and 72 of FIG. 8 are shown. In particular, FIG. 10 indicates the steps used to analyze the paths in view of the timing constraints list and for generating the report files based on the analysis is shown. The FPTA 10 code steps through the list of paths and performs the step shown for each path in the list. Thus, in step 90, the code determines whether or not another path in the list exists. If not, the analysis and report generation is done.

If another path exists in the list, the code determines whether or not timing constraints exist for the path in step 91. For various reasons, the timing constraints of each terminal of the integrated circuit may not be specified. In one embodiment, if the timing constraints do not exist, default timing constraints are used. In this embodiment, paths without timing constraints will not be analyzed.

This is because, if timing constraints do not exist for the path, the code skips analyzing timing of the path, i.e., does not include the file in the list of passed or failed paths. Instead, the code writes information specifying the path to the skipped paths file 51 in step 93. The skipped paths file 51 is used by the ShowSkippedPathsInDP operation 37 to display skipped paths. The reader is referred to FIGS. 16a and 16b for a more detailed discussion of the ShowSkippedPathsInDP operation 37.

If timing constraints exist for the path, the code calculates the fanout for the net associated with the path. That is, the code calculates one less than the number of terminals associated with the given net in step 92. The net delay of a given path is also a function of the fanout of the net associated with the path.

In step 94, the code gets from the constraints database the needed by timing constraint value associated with the load terminal of the path. Next, in step 96, the code gets the driven at timing constraint value associated with the driver terminal of the net. The load terminal is another term for the destination terminal and the driver terminal is another term for the source terminal.

Figure 2:
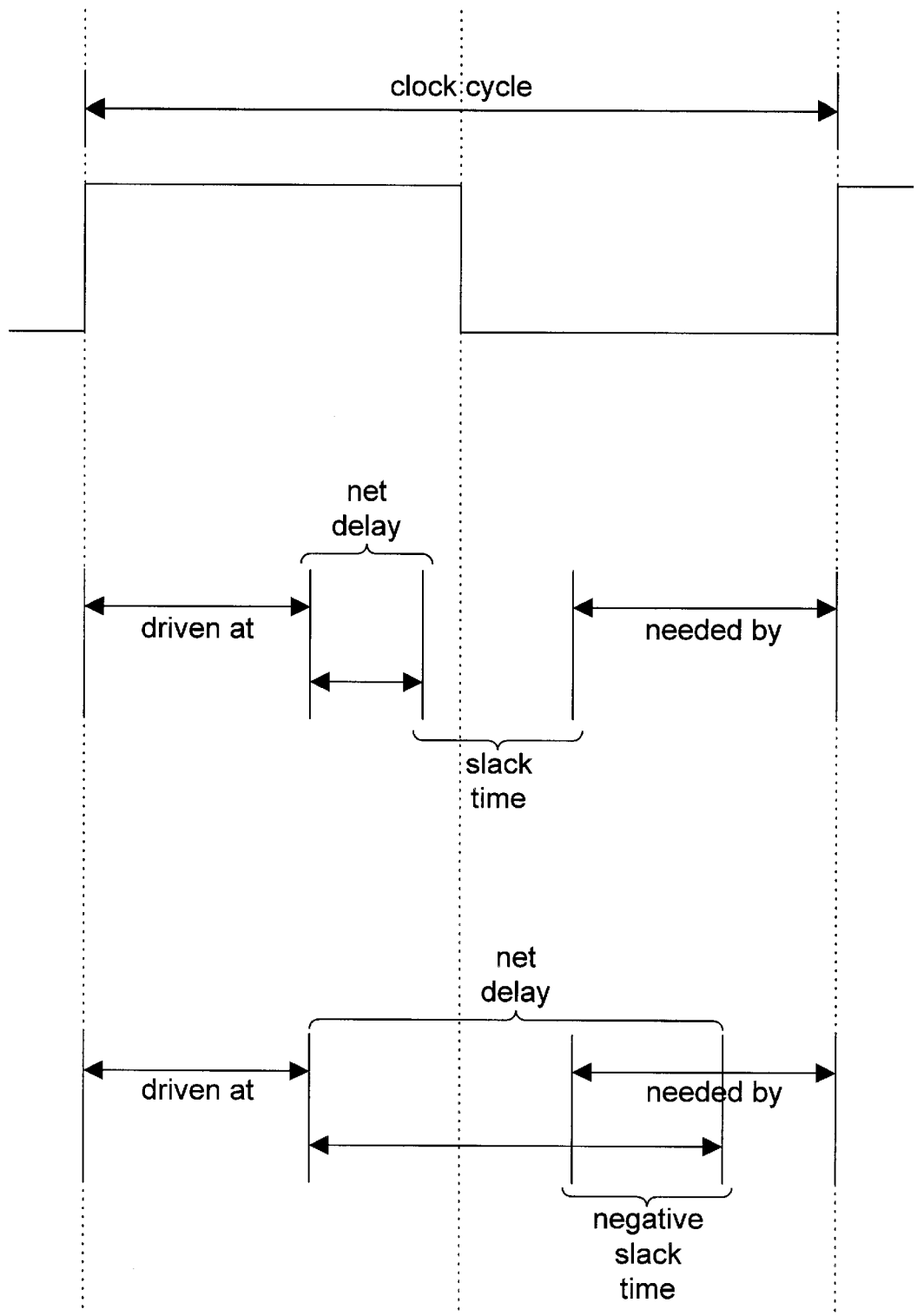
FIG. 2 is a timing diagram illustrating conventional slack time calculations.

Once the timing constraints are determined, the code then calculates the slack time for the path in step 98 according to the manner previously described with respect to FIG. 2.

In step 100, the code determines whether or not the slack time calculated is greater than a slack failure value. The default value for the slack failure value is 0. Preferably, the slack failure value may also be specified by the user. In FIG. 6, it is noted that the slack failure value is shown with a value of −0.3 and labeled as the "fail point". This value is seen just to the lower left hand corner of the histogram of FIG. 6. The fail point may be incremented or decremented by the user by clicking on the "fail point−−" or "fail point++" buttons as seen in FIG. 6.

If the slack time is greater than the slack failure value the code writes information specifying the path to the passed paths file 52 of FIG. 7 in step 102. However, if the slack time is less than the slack failure value the code writes the path information to the failed paths file 50 of FIG. 7 in step 104.

If the path failed, then the net associated with the path is deemed a failure. In this case, the code determines in step 103 if the failed net has already been written to the failed nets file 53 of FIG. 7. If not, the code writes information specifying the net to the failed nets file 53. The failed nets file 53 is used by the SelectFailingNetsInDP operation 36 as described with regard to FIGS. 17a and 17b.

Next, regardless of whether or not the slack time passed or failed, the code writes the path information to the net path result file 48 of FIG. 7 in step 106. The code then returns back to step 90 to determine whether or not there are more paths in the path list to be analyzed. Thus, the EstManhattanPathTiming operation 34 analyzes each of the selected paths in regarding the net delay and timing constraints by calculating the slack time and reporting the analysis in report files.

Figure 11A:
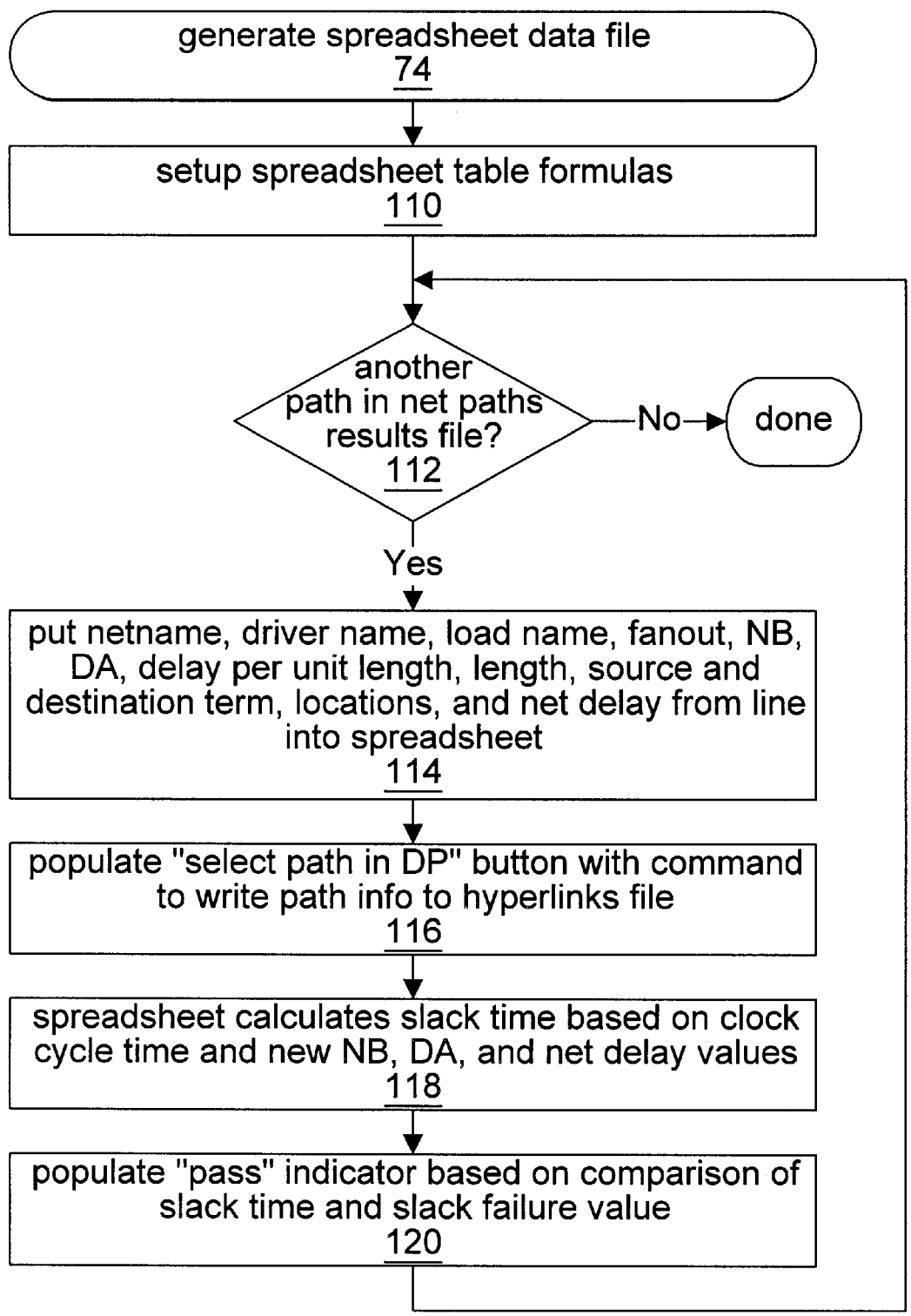
FIG. 11a is a flowchart illustrating detailed steps taken to perform the step of generating the spreadsheet data file of FIG. 8.

Referring now to FIG. 11a, a flowchart illustrating detailed steps taken to perform step 74 of FIG. 8 is shown. In particular, FIG. 11a depicts the steps used in generating the spreadsheet data file 22. In one embodiment, the spreadsheet data file 22 is generated by reading the net path results file 48 of FIG. 7 in order to generate the spreadsheet data file 22. As previously mentioned, the net path results file 48 contains information specifying each of the paths associated with the selected nets.

Preferably, the EstManhattanPathTiming operation 34 invokes a script program written in the PERL language to process the net path results file 48 and generate the spreadsheet data file 22. Preferably, the PERL script sets up spreadsheet table formulas in step 110. The spreadsheet table formulas comprise, inter alia, formulas for calculating slack times. Preferably, the net path results file 48 contains, for each path, a net name, a source terminal name, a destination terminal, a fanout number, a driven at timing constraint, a needed by timing constraint, a net delay value, a delay per unit length value, a path length value, source and destination terminal IDs, and source and destination terminal physical placement coordinates.

The script processes each path specified in the net path results file 48. Thus, in step 112, the PERL script determines whether or not another path is yet to be processed in the net path results file 48. If no more paths are to be processed then the step 74 is done. If another path exists, the PERL script extracts the net name, driver, terminal name, load terminal name, fanout needed by timing constraint, driven at timing constraint, and net delay value from the line in the net path result file 48 and writes these values into the spreadsheet data file 22 of FIG. 7 in step 114.

The PERL script writes to the spreadsheet data file 22 hyperlink information in step 116. The hyperlink information comprises a hyperlink button, several of which are shown in FIG. 6, labeled "select path in DP". Additionally, the hyperlink information comprises a spreadsheet command which is executed when a user clicks on, i.e., selects the "select path in DP" button. The hyperlink command instructs the spreadsheet to write information specifying the path associated with the hyperlink button to the hyperlinks file 24 of FIG. 7. By selecting the "select path in DP" button, the user selects the path associated with the hyperlink button for later display by the chip floorplan editor 14 in the graphical view of the floorplan.

Figure 11B:
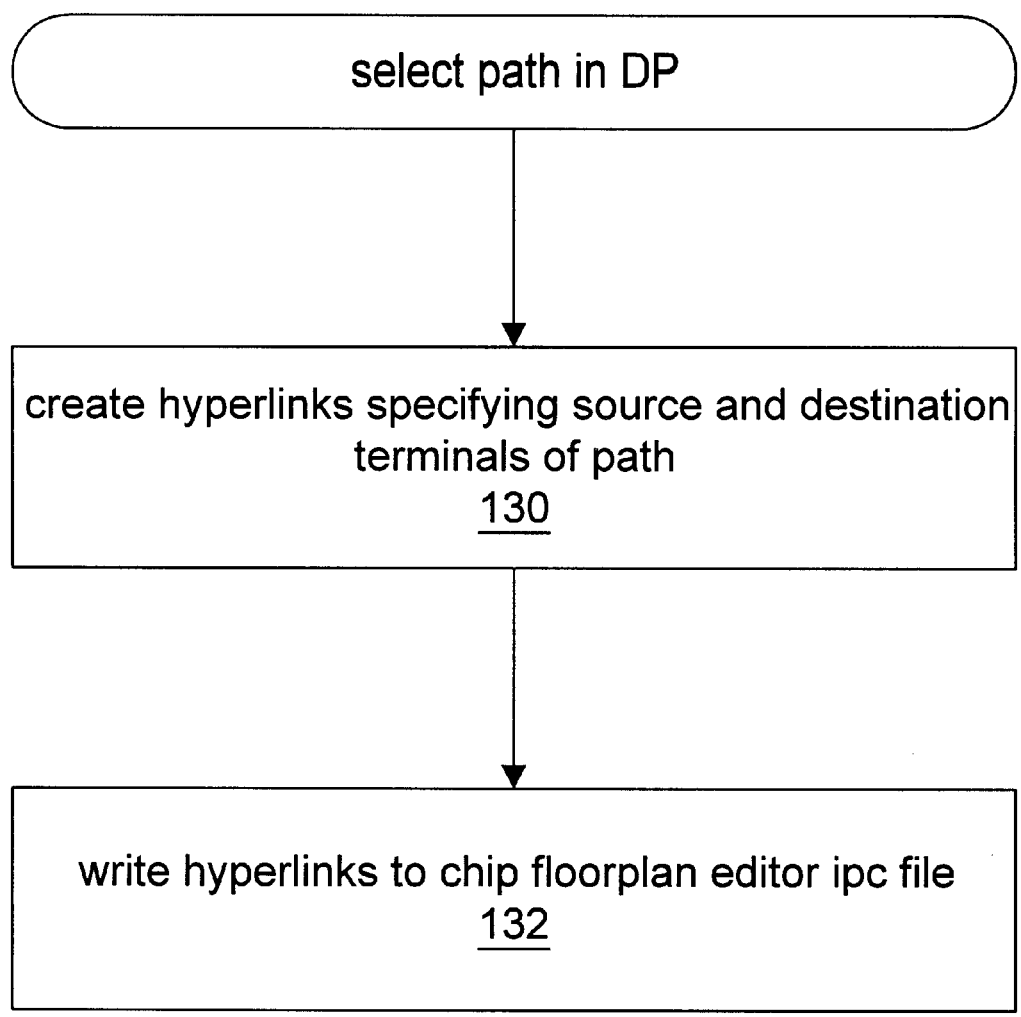
FIG. 11b is a flowchart illustrating steps performed in response to the "select path in DP" hyperlink button of FIG. 6.

Referring now to FIG. 11b, a flowchart illustrating steps taken in response to a user selecting the "select path in DP" hyperlink button is shown. In particular, in step 130, the spreadsheet creates hyperlinks specifying the source and destination terminals of the path associated with the hyperlink button selected. The hyperlinks comprise specifications of the source and destination terminals of the path. The information is preferably similar to the information contained in the failed paths file 50, skipped paths file 51, and passed paths 52 of FIG. 7. That is, the name, identifier, and coordinates for both the source and destination terminal associated with the path are specified in the hyperlinks. The hyperlinks are then written to the hyperlinks file 24 in step 132.

Referring again to FIG. 11a, in addition to the generation of spreadsheet data by the PERL script, the spreadsheet engine 12 calculates slack times based on the clock cycle value of the integrated circuit, the new timing constraints, and the calculated net delay values according to the formulas set up in the spreadsheet tables in step 110 and displays the new slack times in the spreadsheet as shown in FIG. 6 in step 118.

FIG. 6 shows, just below the bottom right hand corner of the histogram, two buttons, a "Net=0" button, and a "Net<>0" button. These buttons enable a user to choose a net delay value shown in the spreadsheet of FIG. 6 under the heading Tnet, to be a value of zero rather than the previously calculated net delay value. By default, the Tnet or net delay value is that value previously calculated. However, if the user clicks on the net equals zero value, all of the net delay values will be changed to zero and the slack values shown in FIG. 6 will responsively be recalculated incorporating the net delay value of zero. In order to revert back to a net delay of non-zero (net delay calculated) the user clicks on the "Net<>0" button. Thus, the "Net=0" button enables the designer to determine whether or not a suitable floorplan which meets the specified timing constraints theoretically exists.

Referring again to FIG. 11a, the slack times are calculated by the spreadsheet engine 12 each time new values used in the slack time calculations are updated. Each time the slack times are calculated, the spreadsheet engine 12 also populates a visual pass or fail indicator and displays the indicator in the spreadsheet by comparing the value of the slack time calculated for the particular path with the slack failure value in step 120.

Preferably, the slack time pass indicator provides visual indication of whether the slack time passed or failed. In one embodiment, shown in FIG. 6, the pass indicator is a button. Buttons corresponding to paths which have passing slack times can be illuminated in green, whereas pass indicator buttons associated with paths which have failing slack times can be indicated in red. As previously mentioned, the slack failure value with which the slack time is compared in order to determine the value of the pass indicator has a default value of zero but may also be specified by user input. The visual pass indicator provides an easily recognizable means for the user to determine potential problem paths, that is those that fail to meet the timing constraints specified by the integrated circuit design.

Figure 12A:
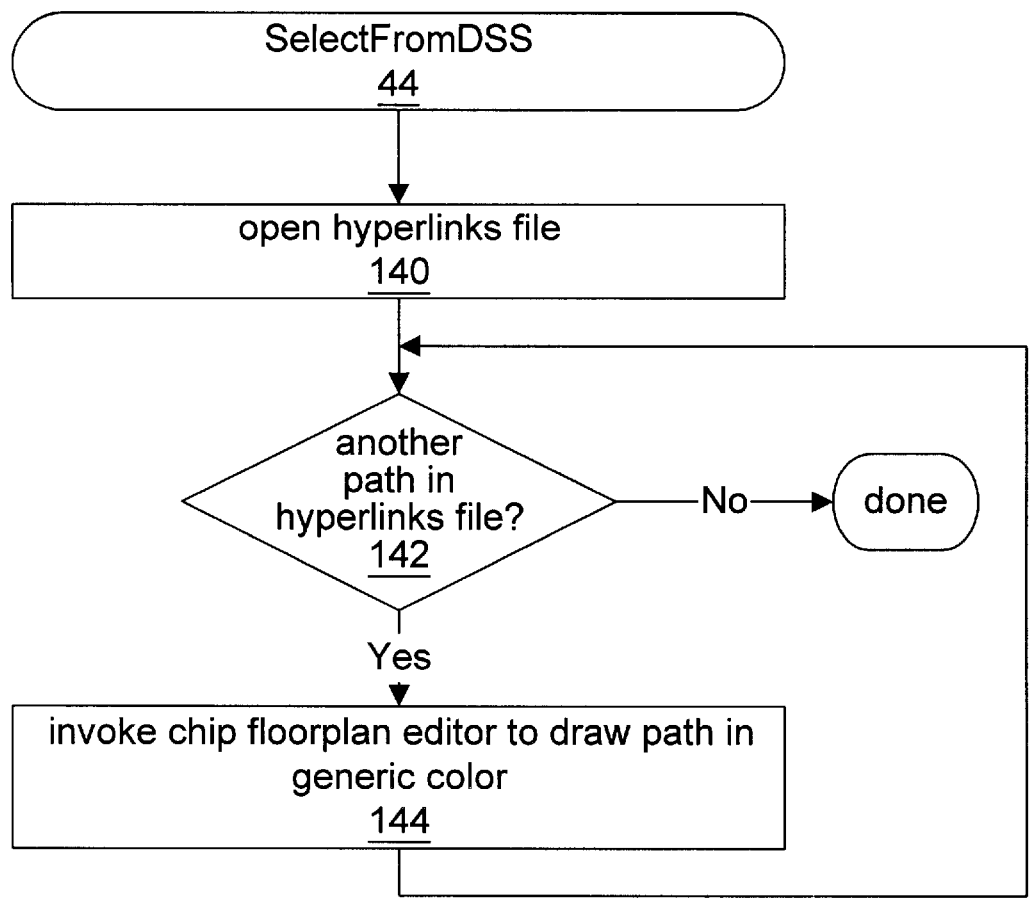
FIG. 12a is a flowchart illustrating steps performed in response to the "SelectFromDSS" menu selection of FIG. 4.

Referring now to FIG. 12a, a flow chart illustrating detailed steps taken to perform the SelectFromDSS operation 44 of FIG. 7 is shown. Once the user selects the desired paths via the "select paths in DP" hyperlink buttons of FIG. 6 as described in the flow chart of FIG. 11b, the user then displays the selected paths in the chip floorplan editor cell view display as shown in FIG. 12b by selecting the SelectFromDSS operation 44 from the FPTA 10 main menu.

The SelectFromDSS operation 44 opens the hyperlinks file 24 of FIG. 7 to receive information specifying the selected paths in step 140. In step 142, the operation 44 determines whether or not another path in the hyperlinks file 24 requires processing. If not, the operation 44 is complete. However, if another path exists in the hyperlink file 24, the operation 44 invokes the chip floorplan editor 14 to draw the paths specified in the hyperlinks file 24 on the cell view of the floorplan in step 144.

Preferably, the path is drawn in a color which is generic, that is a color not indicating whether the path was passed or failed regarding slack time values. In one embodiment, a suitable generic color is yellow. Once the path is drawn, the operation 44 proceeds back to step 142 to determine whether or not additional paths exist to be drawn and thus continues until all paths have been drawn. FIG. 12b shows one single path having been selected and drawn on the cell view of the chip floorplan editor 14.

Figure 12B:
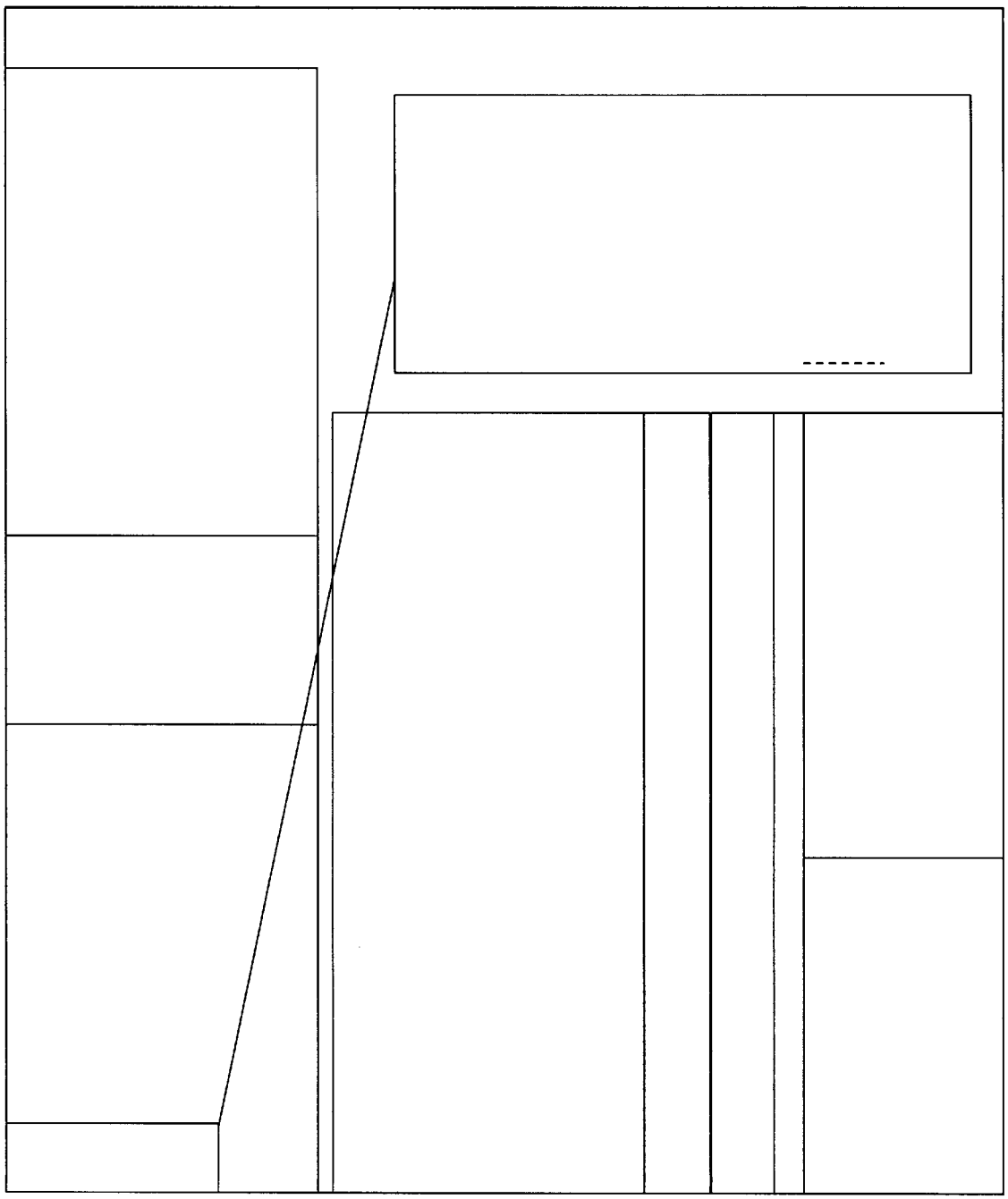

The paths displayed in FIG. 12b, as in FIGS. 13b, 14b, 15b, and 16b, are commonly referred to as "flylines", in that they are lines which connect circuit portions "as the crow flies", i.e., a direct line from one point to another point.

Thus, the method of the present invention advantageously enables a floorplan designer to choose a floorplan and receive multi-dimensional feedback regarding the timing quality of the floorplan and determine problem nets or problem placements of the elements of the integrated circuit and iterate on the floorplan design until an acceptable floorplan is achieved. The present invention advantageously enables the floorplan designer to link the timing information displayed in the spreadsheet to a graphical view of the paths and/or nets selected by the designer, thus enabling the designer to employ his or her expert knowledge in making intuitive evaluations of the timing quality of the selected floorplan.

Showing Paths and Nets In A Graphical View of the Floorplan

Referring now to FIG. 13a, a flow chart illustrating steps taken to perform the ShowFailingPathsInDP operation 38 of FIG. 7 is shown. Once the user executes the EstManhattanPathTiming operation 34 as described in the flow chart of FIG. 8, the user then displays the failing paths in the chip floorplan editor cell view display as shown in FIG. 13b by selecting the ShowFailingPathsInDP operation 38 from the FPTA 10 main menu.

In some situations, particularly early in the design process, the terminal locations of some of the circuit blocks may not have been defined. In such case, the floorplan designer may choose to simplify the floorplanning problem by placing all of the terminals of a given block in the center of the block. The chip floorplan editor 14 allows the designer to place all of the terminals in the center of the block. The FPTA 10 is configured to display paths and nets independent of the locations of the terminal pins. FIG. 13b shows some paths in which the terminals of a block have been placed in the center of the block.

The ShowFailingPathsInDP operation 38 opens the failed paths file 50 of FIG. 7 to receive information specifying the failed paths in step 150. In step 152, the operation 38 determines whether or not another path in the failed paths file 50 requires processing. If not, the operation 38 is complete, however, if another path exists in the failed paths file 50, the operation 38 invokes the chip floorplan editor 14 to draw the paths specified in the failed paths file 50 on the cell view of the floorplan in step 154.

Preferably, the path is drawn in a color which indicates the path failed regarding slack time values. In one embodiment, the failing color is red. Once the path is drawn, the operation 38 proceeds back to step 152 to determine whether or not additional paths exist to be drawn and thus continues until all paths have been drawn. FIG. 13b shows a plurality of failing paths drawn on the cell view of the chip floorplan editor 14.

Figure 14A:
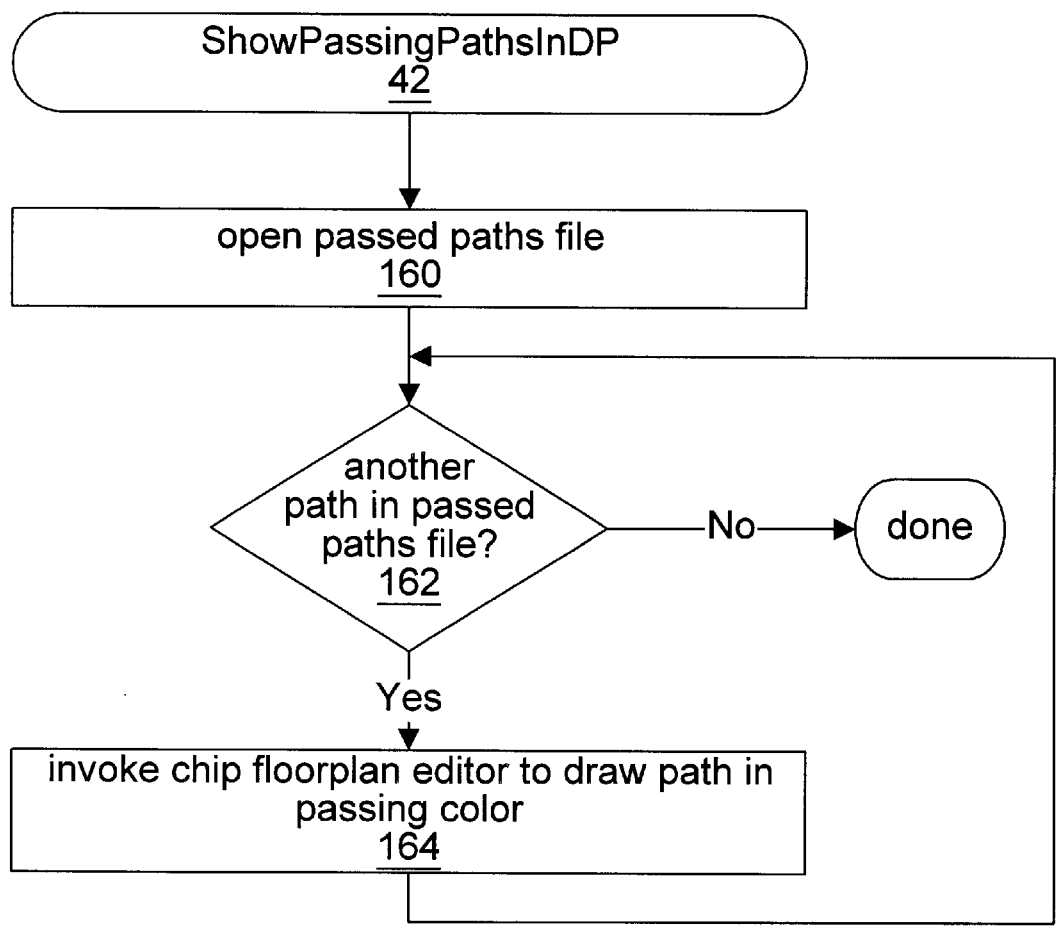
FIG. 14a is a flowchart illustrating steps performed in response to the "ShowPassingPathsInDP" menu selection of FIG. 4.
Figure 14B:
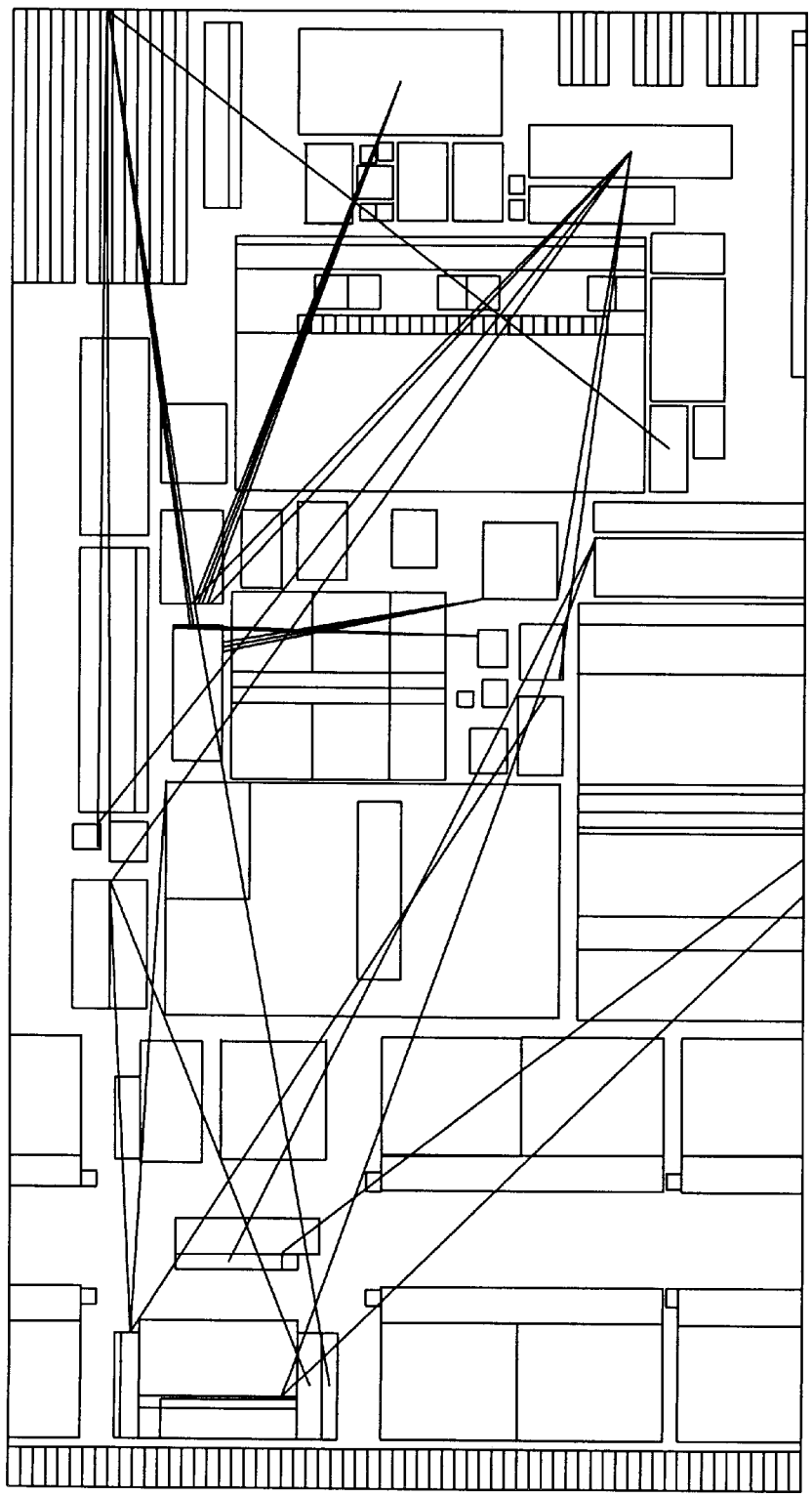

Referring now to FIG. 14a, a flow chart illustrating steps taken to perform the ShowPassingPathsInDP operation 42 of FIG. 7 is shown. Once the user executes the EstManhattanPathTiming operation 34 as described in the flow chart of FIG. 8, the user then displays the passing paths in the chip floorplan editor cell view display as shown in FIG. 14b by selecting the ShowPassingPathsInDP operation 42 from the FPTA 10 main menu.

The ShowPassingPathsInDP operation 42 opens the passed paths file 52 of FIG. 7 to receive information specifying the passed paths in step 160. In step 162, the operation 42 determines whether or not another path in the passed paths file 52 requires processing. If not, the operation 42 is complete, however, if another path exists in the passed paths file 52, the operation 42 invokes the chip floorplan editor 14 to draw the paths specified in the passed paths file 52 on the cell view of the floorplan in step 164.

Preferably, the path is drawn in a color which indicates the path passed regarding slack time values. In one embodiment, the passing color is green. Once the path is drawn, the operation 42 proceeds back to step 162 to determine whether or not additional paths exist to be drawn and thus continues until all paths have been drawn. FIG. 14b shows a plurality of passing paths drawn on the cell view of the chip floorplan editor 14.

Figure 15A:
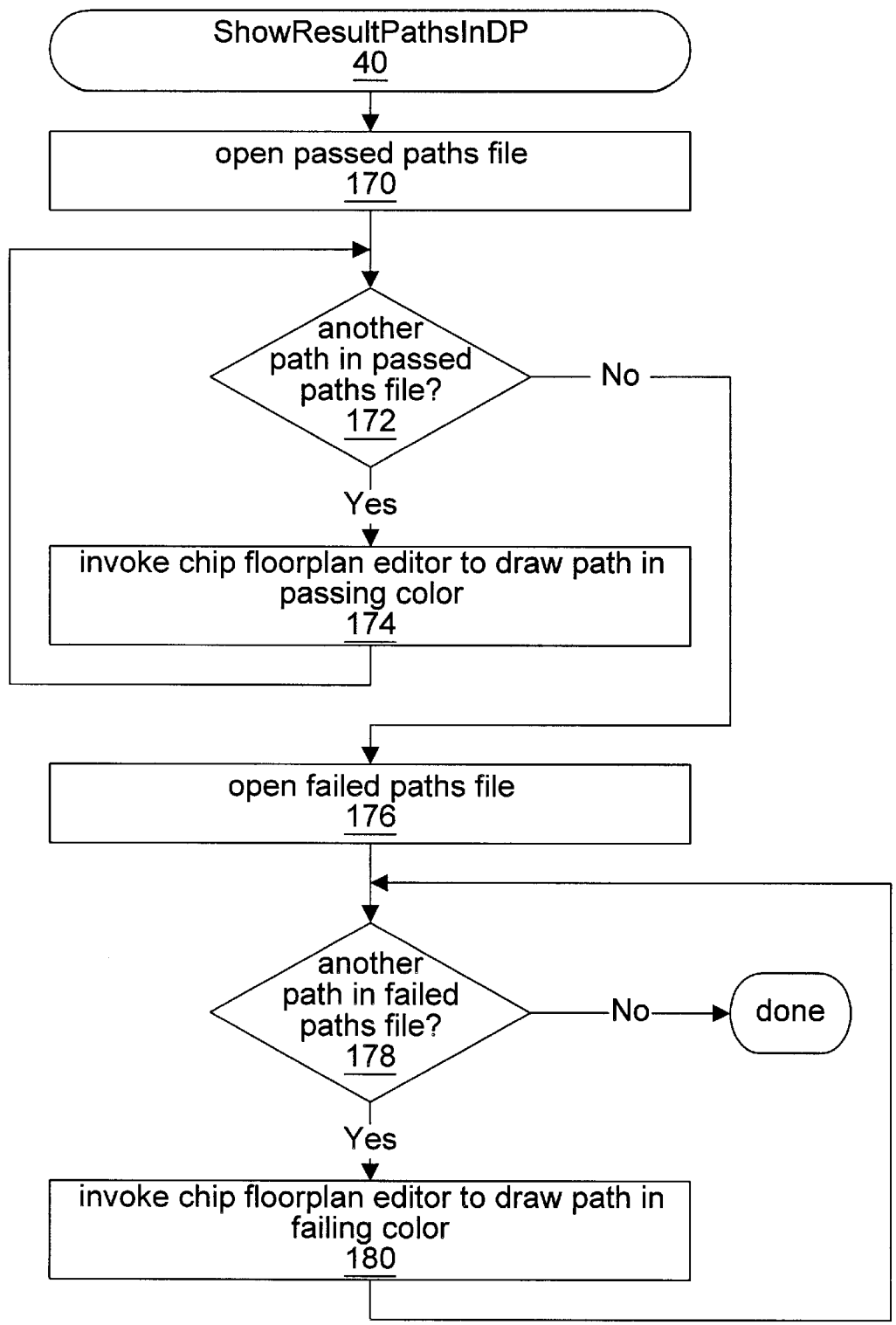
FIG. 15a is a flowchart illustrating steps performed in response to the "ShowResultPathsInDP" menu selection of FIG. 4.
Figure 15B:
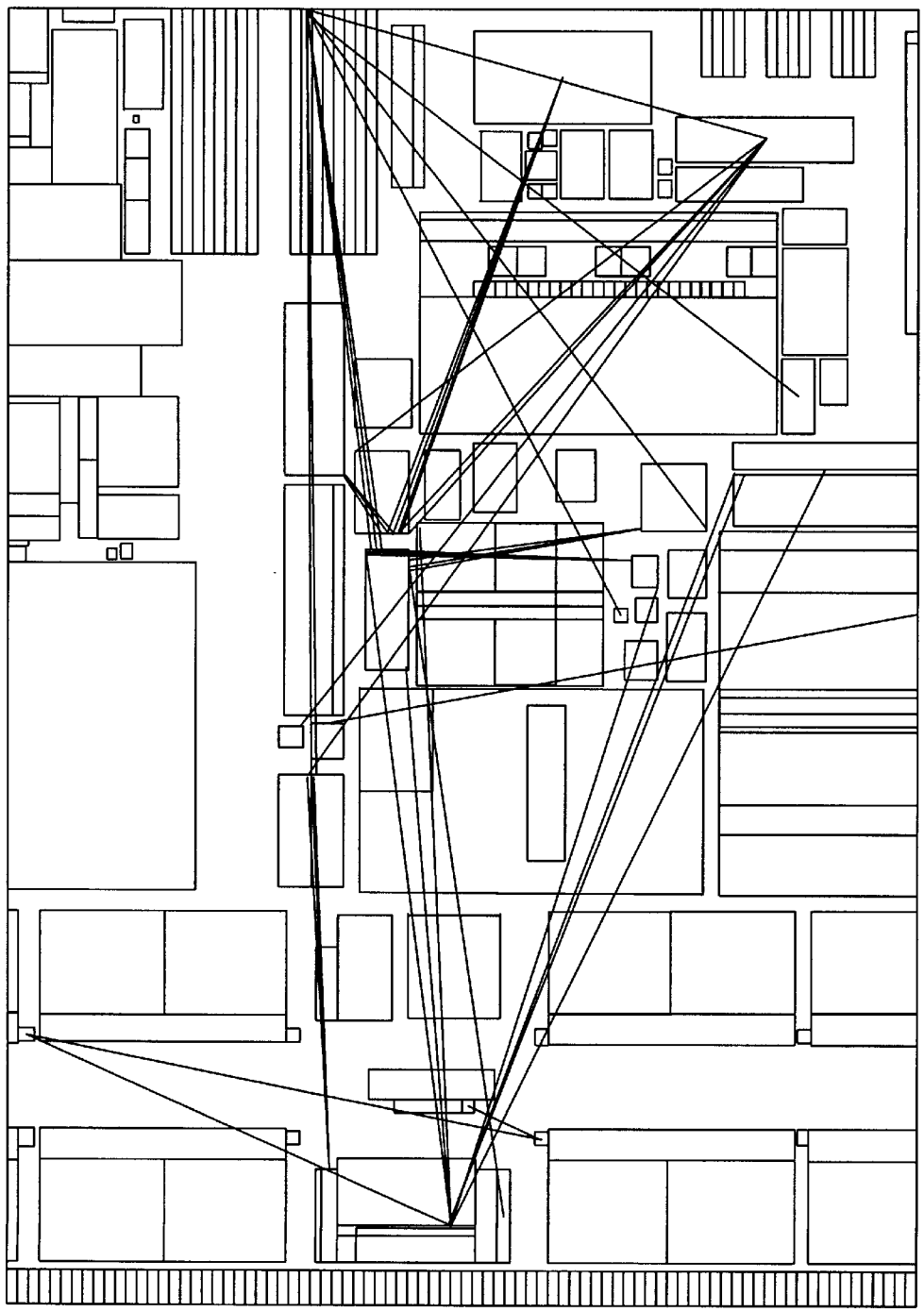

Referring now to FIG. 15a, a flow chart illustrating steps taken to perform the ShowResultPathsInDP operation 40 of FIG. 7 is shown. Once the user executes the EstManhattanPathTiming operation 34 as described in the flow chart of FIG. 8, the user then displays the selected and analyzed paths, i.e., both passing and failing, but not skipped, paths in the chip floorplan editor cell view display as shown in FIG. 15b by selecting the ShowResultPathsInDP operation 40 from the FPTA 10 main menu.

The ShowResultPathsInDP operation 40 opens the passed paths file 52 of FIG. 7 to receive information specifying the passed paths in step 170. In step 172, the operation 40 determines whether or not another path in the passed paths file 52 requires processing. If another path exists in the passed paths file 52, the operation 40 invokes the chip floorplan editor 14 to draw the paths specified in the passed paths file 52 on the cell view of the floorplan in step 174.

Preferably, the path is drawn in a color which indicates the path passed regarding slack time values. In one embodiment, the passing color is green. Once the path is drawn, the operation 40 proceeds back to step 172 to determine whether or not anymore paths exist to be drawn and thus continues until all paths have been drawn. FIG. 15b shows a plurality of result paths, i.e., passing and failing paths, drawn on the cell view of the chip floorplan editor 14.

If the operation determines in step 172 that no more paths exists in the passed paths file 52 to be processes, the operation 40 opens the failed paths file 50 of FIG. 7 to receive information specifying the failed paths in step 176. In step 178, the operation 40 determines whether or not another path in the failed paths file 50 requires processing. If not, the operation 40 is complete, however, if another path exists in the failed paths file 50, the operation 40 invokes the chip floorplan editor 14 to draw the paths specified in the failed paths file 50 on the cell view of the floorplan in step 180.

Preferably, the path is drawn in a color which indicates the path failed regarding slack time values. In one embodiment, the failing color is red. Once the path is drawn, the operation 40 proceeds back to step 178 to determine whether or not anymore paths exist to be drawn and thus continues until all paths have been drawn. FIG. 15b shows a plurality of result paths, i.e., passing and failing paths, drawn on the cell view of the chip floorplan editor 14.

Figure 16A:
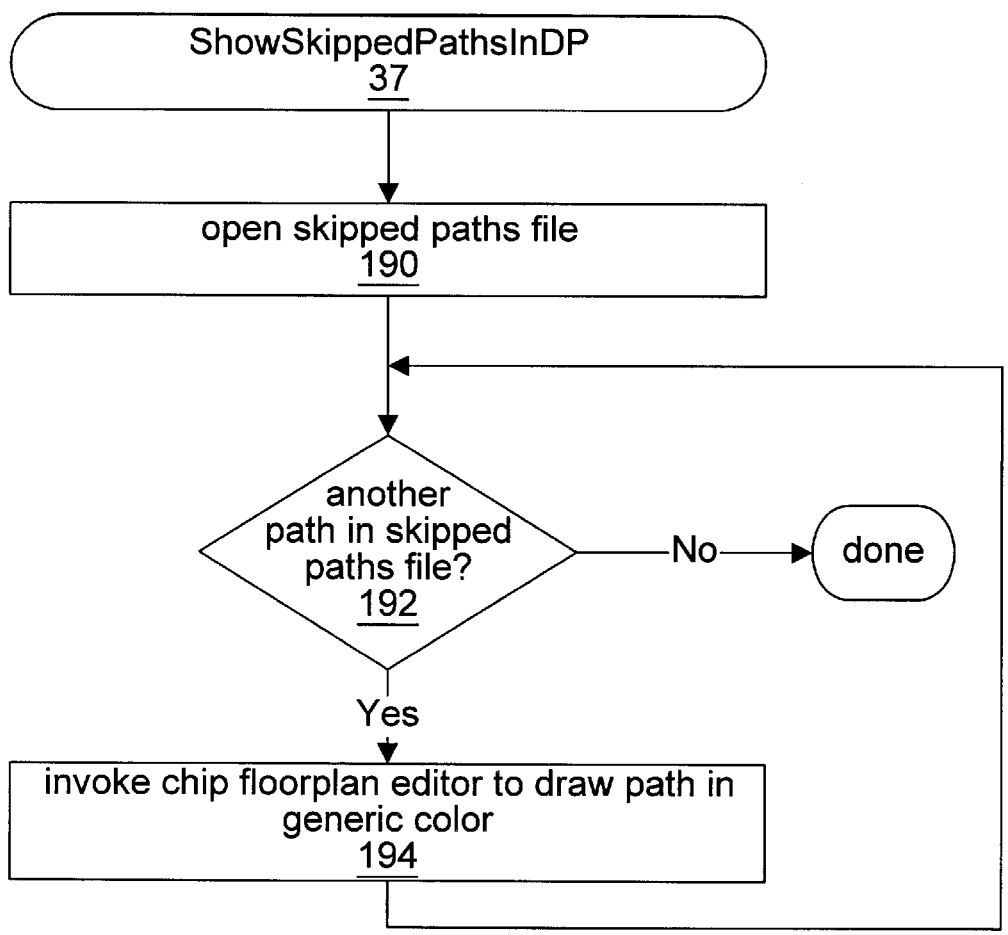
FIG. 16a is a flowchart illustrating steps performed in response to the "ShowSkippedPathsInDP" menu selection of FIG. 4.
Figure 16B:
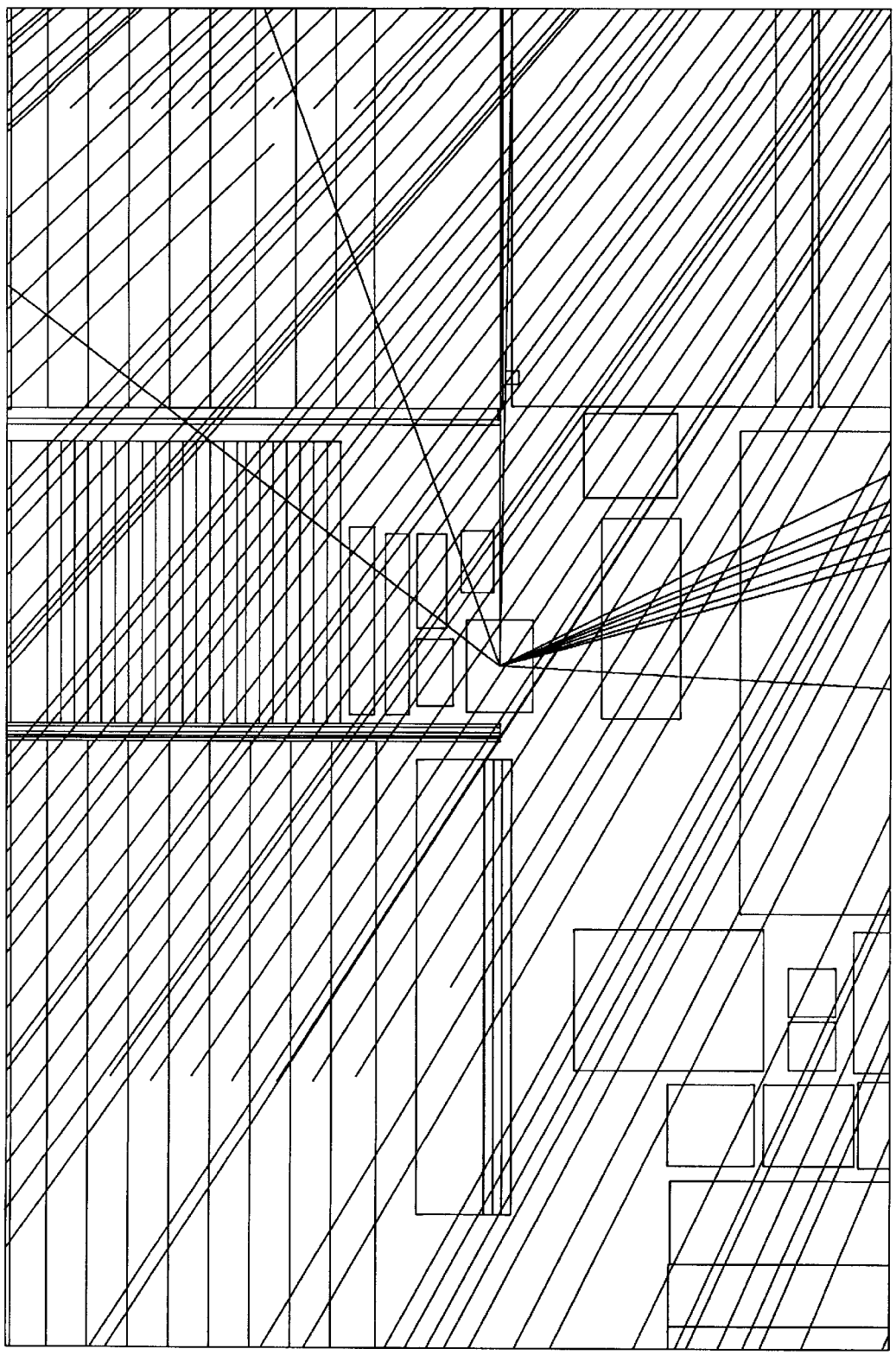

Referring now to FIG. 16a, a flow chart illustrating steps taken to perform the ShowSkippedPathsInDP operation 37 of FIG. 7 is shown. Once the user executes the EstManhattanPathTiming operation 34 as described in the flow chart of FIG. 8, the user then displays the skipped paths in the chip floorplan editor cell view display as shown in FIG. 16b by selecting the ShowSkippedPathsInDP operation 37 from the FPTA 10 main menu.

The ShowSkippedPathsInDP operation 37 opens the skipped paths file 51 of FIG. 7 to receive information specifying the skipped paths in step 190. In step 192, the operation 37 determines whether or not another path in the skipped paths file 51 requires processing. If not, the operation 37 is complete, however, if another path exists in the skipped paths file 51, the operation 37 invokes the chip floorplan editor 14 to draw the paths specified in the skipped paths file 51 on the cell view of the floorplan in step 194.

Preferably, the path is drawn in a generic color which indicates the path was skipped in regard to timing analysis, due to lack of timing constraint availability for one or both of the terminals associated with the path. In one embodiment, the generic color is yellow. Once the path is drawn, the operation 37 proceeds back to step 192 to determine whether or not anymore paths exist to be drawn and thus continues until all paths have been drawn. FIG. 16b shows a plurality of skipped paths drawn on the cell view of the chip floorplan editor 14.

Figure 17A:
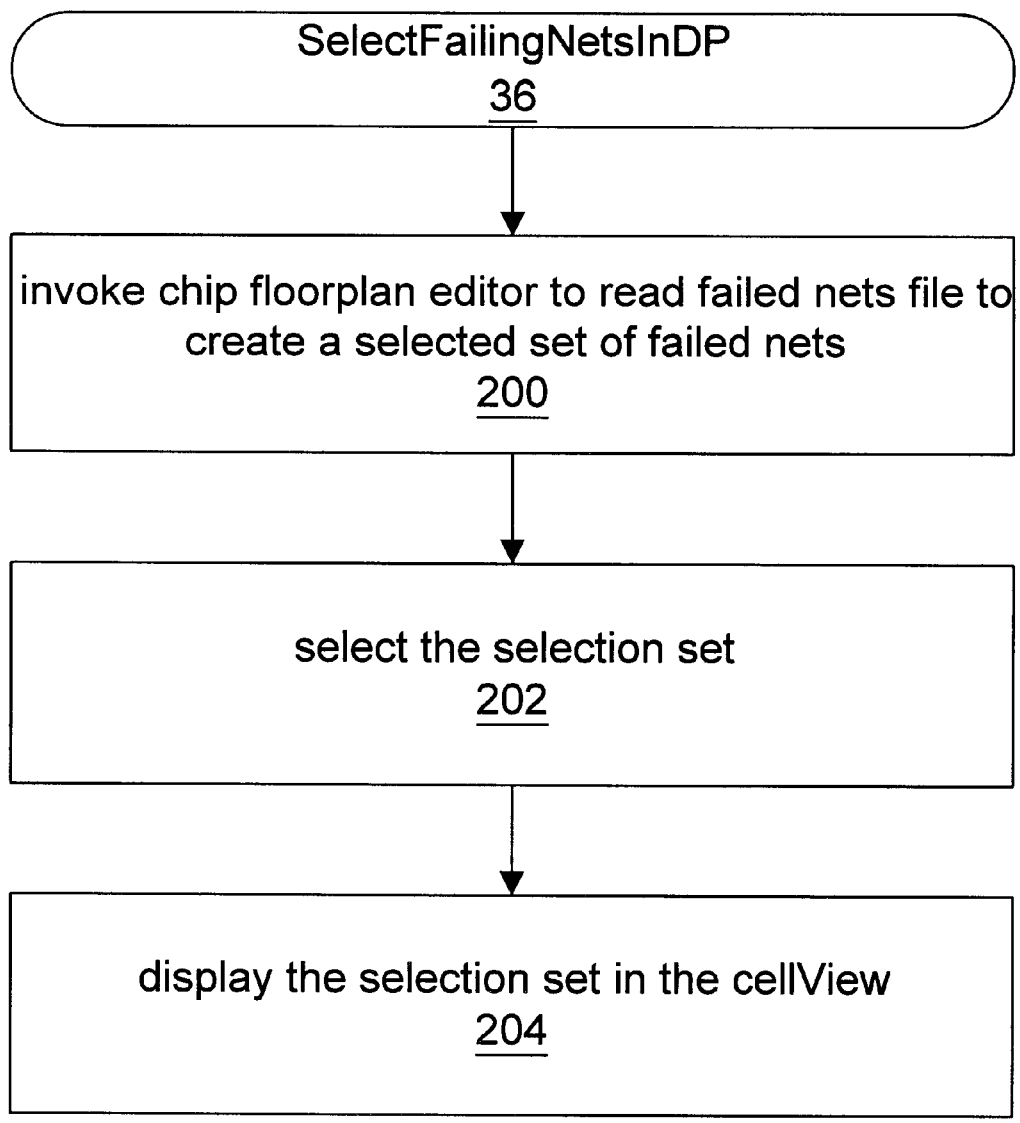
FIG. 17a is a flowchart illustrating steps performed in response to the "SelectFailingNetsInDP" menu selection of FIG. 4.
Figure 17B:
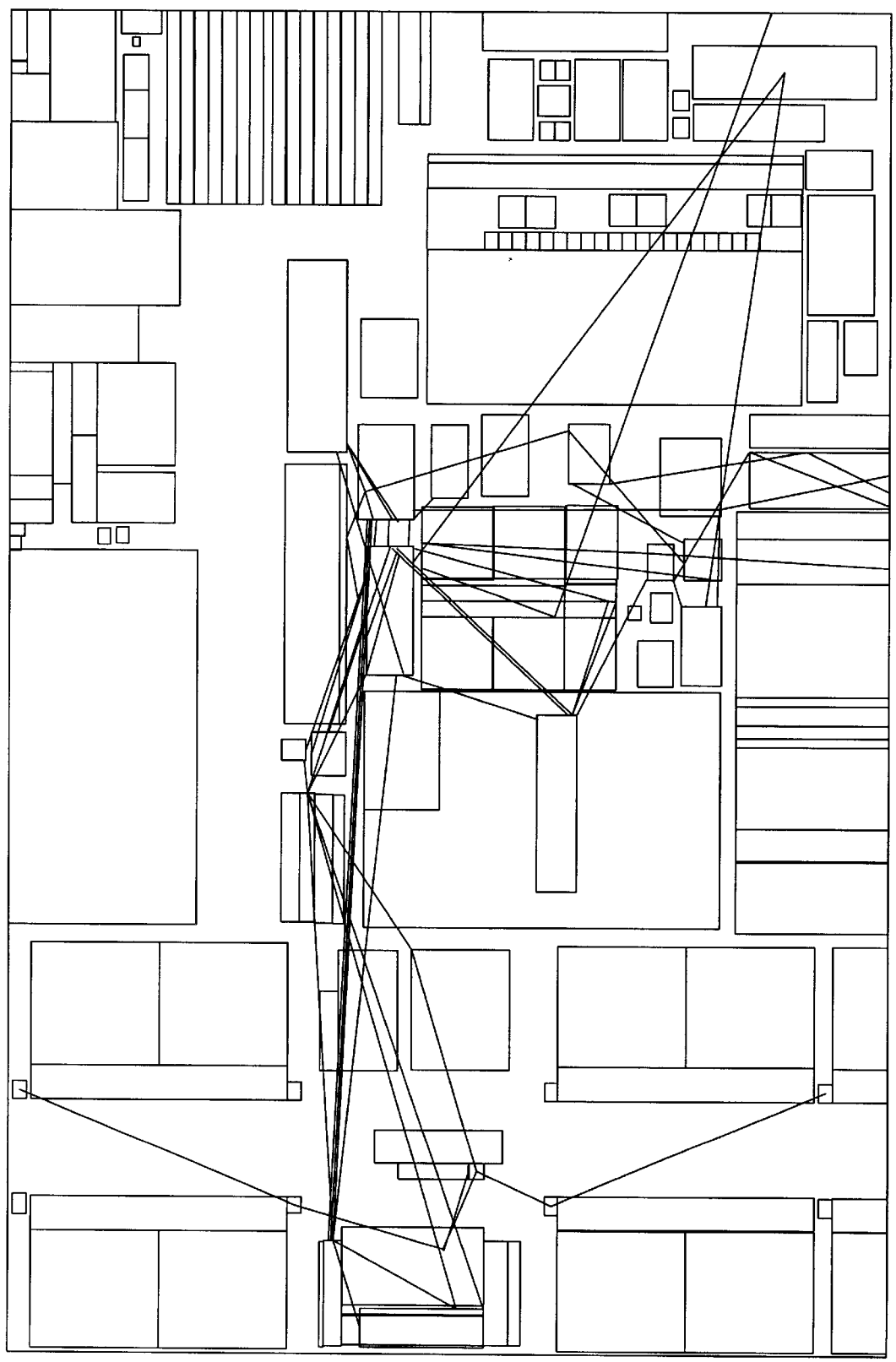

Referring now to FIG. 17a, a flow chart illustrating steps taken to perform the SelectFailingNetsInDP operation 36 of FIG. 7 is shown. Once the user executes the EstManhattan-PathTiming operation 34 as described in the flow chart of FIG. 8, the user then displays failing nets in the chip floorplan editor cell view display as shown in FIG. 17b by selecting the SelectFailingNetsInDP operation 36 from the FPTA 10 main menu. A failing net is defined as a net which has one or more associated failing paths.

The SelectFailingNetsInDP operation 36 invokes the chip floorplan editor 14 to read the failed nets file 53 of FIG. 7 to create a selected set of failed nets in step 200. In step 202, the operation 36 invokes the chip floorplan editor 14 to select the selection set defined in step 200. The operation 36 then invokes the chip floorplan editor 14 to draw the nets in the selection set, i.e., the nets specified in the failed nets file 53 on the cell view of the floorplan in step 204.

Preferably, the net is drawn as a set of flylines which "stitch together" the terminals of the net. Therefore, if a net comprises N terminals, N–1 flylines will connect the terminals of the net with no two flylines intersecting each other. FIG. 17b shows a plurality of failed nets drawn on the cell view of the chip floorplan editor 14.

Thus, the method of the present invention advantageously enables a floorplan designer to choose a floorplan and receive multi-dimensional feedback regarding the timing quality of the floorplan and determine problem nets or problem placements of the elements of the integrated circuit and iterate on the floorplan design until an acceptable floorplan is achieved. The present invention advantageously enables the floorplan designer to display failing, passing, skipped or all paths and/or nets, thus enabling the designer to employ his or her expert knowledge in making intuitive evaluations of the timing quality of the selected floorplan.

Figure 18A:
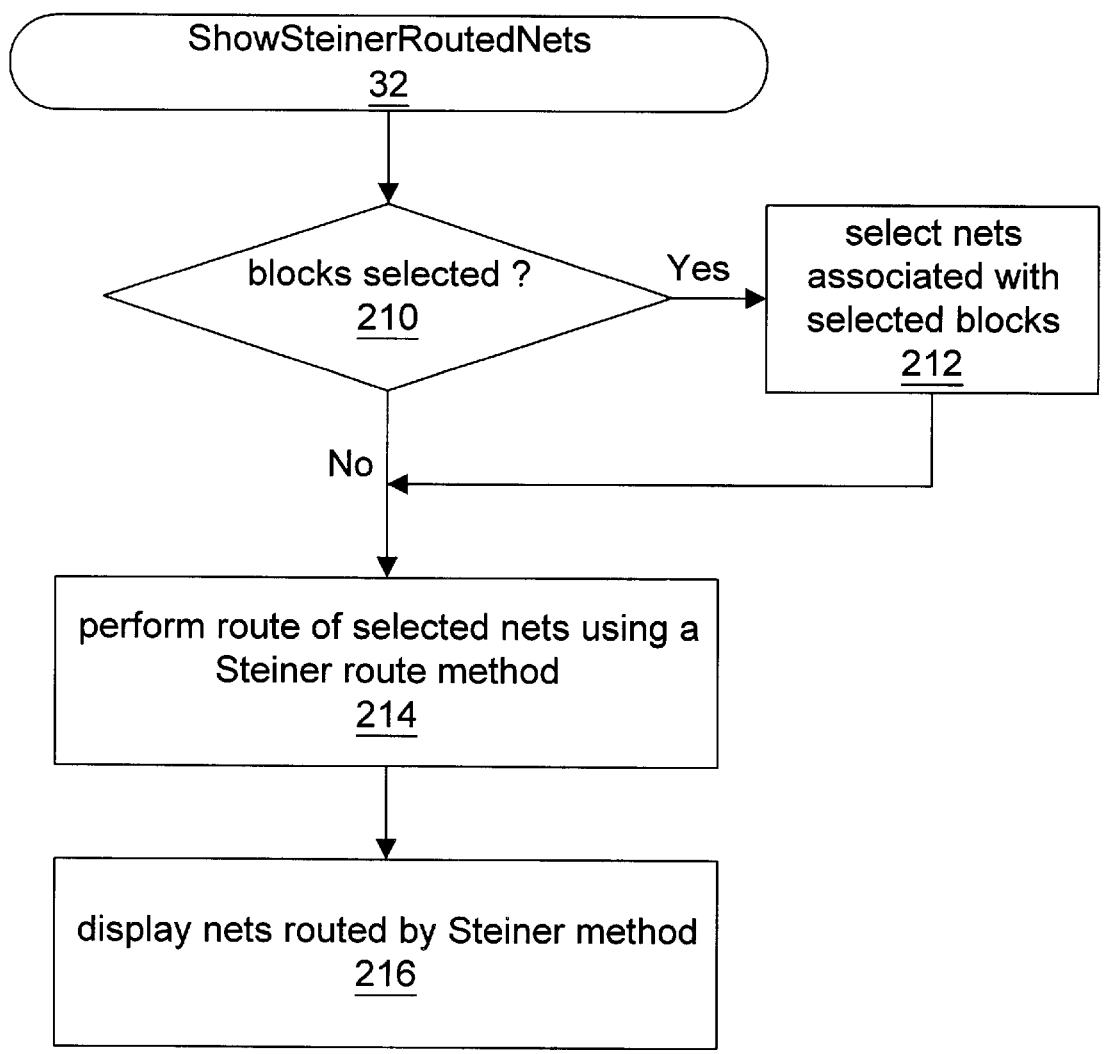
FIG. 18a is a flowchart illustrating steps performed in response to the "ShowSteinerRoutedNets" menu selection of FIG. 4.
Figure 18B:
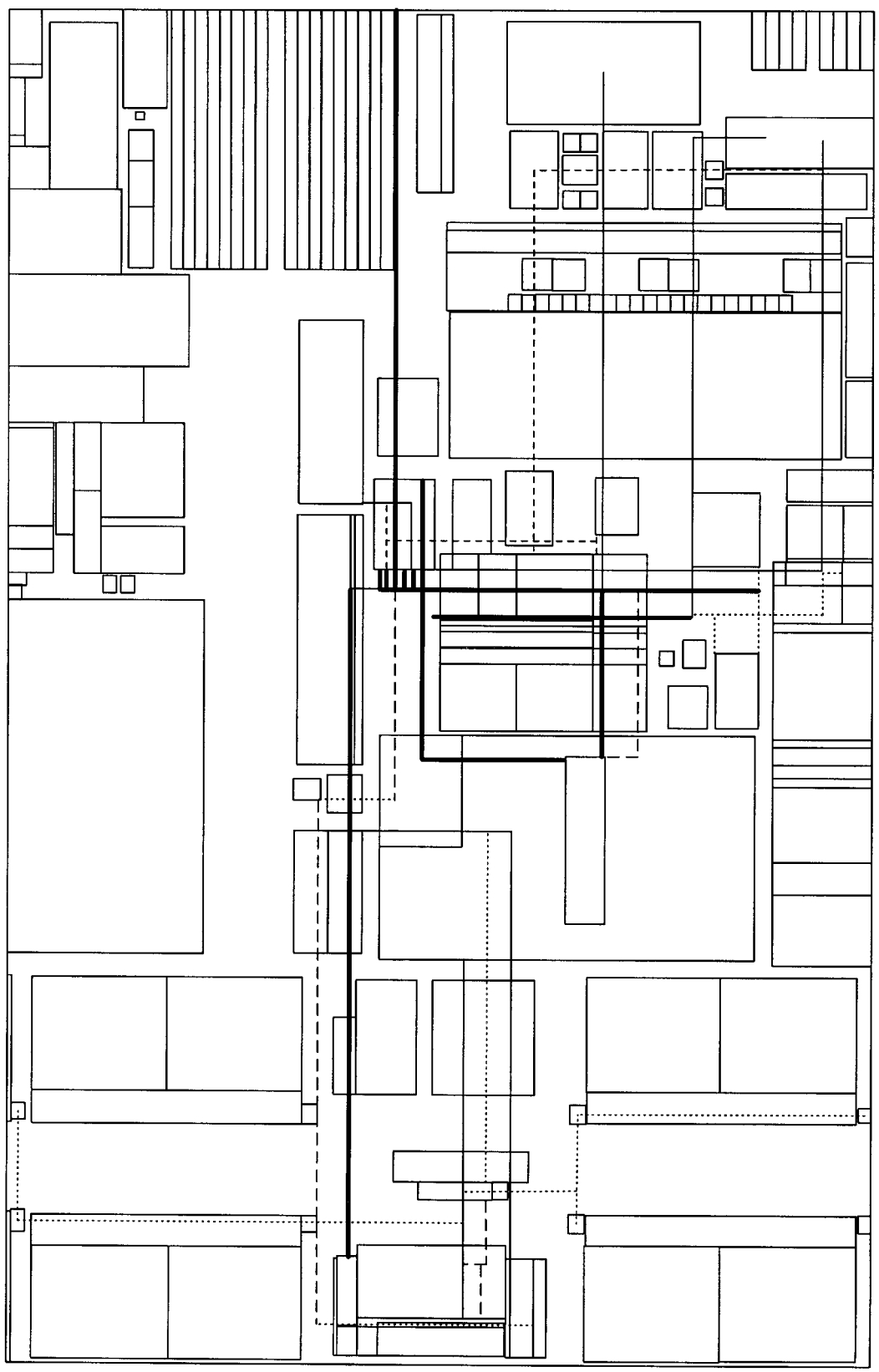

Referring now to FIG. 18a, a flowchart illustrating steps performed in response to the "ShowSteinerRoutedNets" menu selection of FIG. 4 is shown. The ShowSteinerRoutedNets operation 32 displays a Steiner route for the selected portion of the integrated circuit. In step 210, the operation 32 queries the chip floorplan editor 14 to determine whether or not any blocks were selected by the user. If so, the operation 32 invokes the chip floorplan editor 14 to select the nets connected to the selected blocks and add the selected nets to the select set of explicitly selected nets by the user, in any, in step 212.

Next, the operation 32, invokes the chip floorplan editor 14 to perform a route of the selected nets using a Steiner route method in step 214. Finally, the operation 32 invokes the chip floorplan editor 14 to display the routed Steiner nets in the select set in step 216 as shown, for example, in FIG. 18b.

Histogram Feedback

Figure 19:
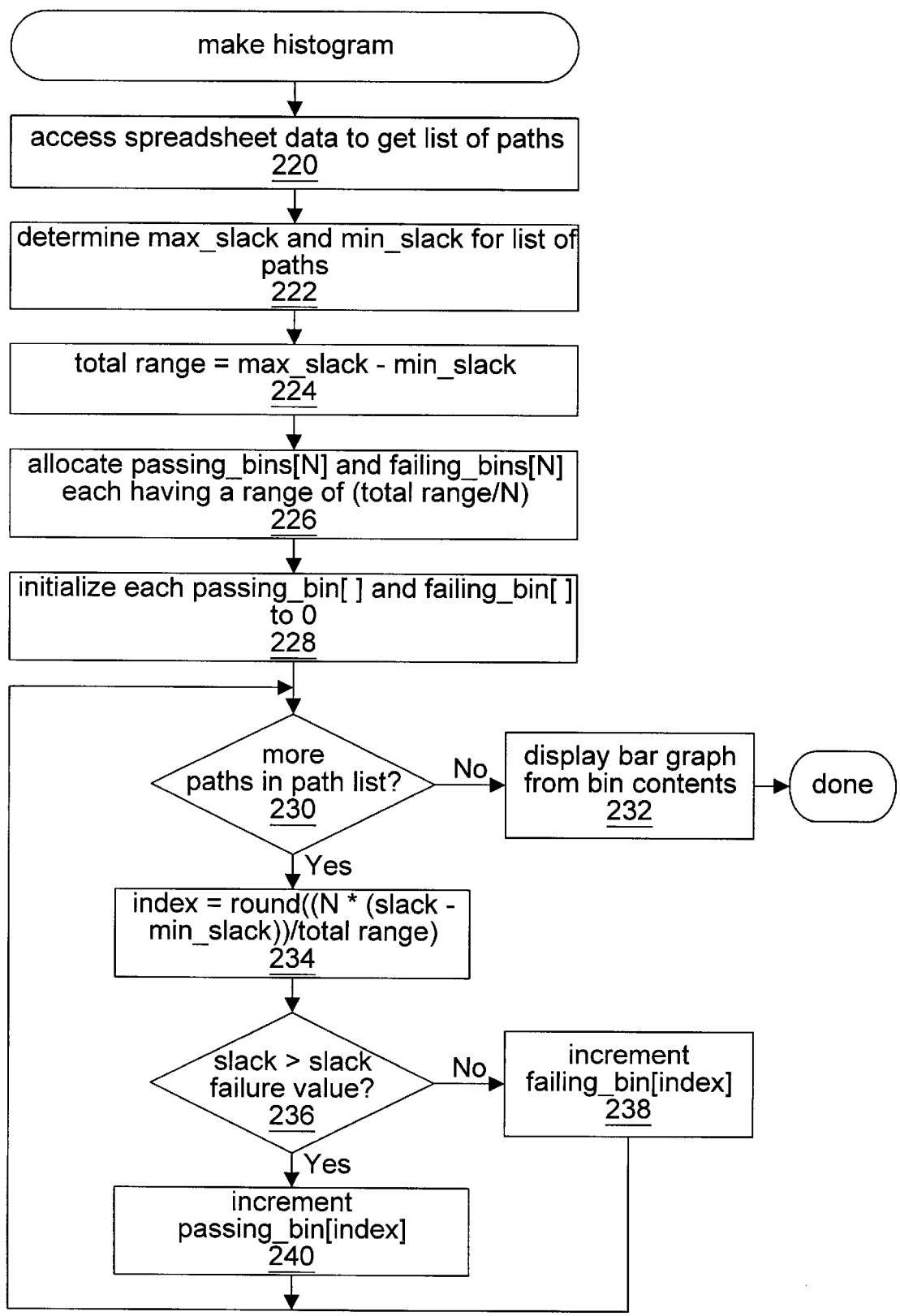
FIG. 19 is a flowchart illustrating steps performed in response to the "make histogram" button of FIG. 6.

Referring now to FIG. 19, a flowchart illustrating steps performed in response to a user selecting the "make histogram" button of FIG. 6 is shown. The spreadsheet engine 12 accesses the spreadsheet data to get the list of paths specified in the spreadsheet data file 22 in step 220. Next, the spreadsheet engine 12 determine the maximum and minimum slack times from the list of paths in step 222. The spreadsheet engine 12 then calculate the total range of the histogram by subtracting the maximum slack time from the minimum slack time in step 224.

The spreadsheet engine 12 separates the slack times into an array of bins of a predetermined number. In the histogram shown in FIG. 6 the number of bins is 25. Each bin contains a count of the number of paths whose slack time falls within the range of the bin. Each bin has a range the size of which is the total range calculated in step 224 divided by the number of bins. The bottom bin, or left-most bin, has a lower range limit of the minimum slack time determined in step 222. The next bin up has a lower range limit of the minimum slack time plus the range of a single bin, and so forth until the top bin has an upper range limit of the maximum slack time determined in step 222. The spreadsheet engine 12 allocates two arrays of bins, each array having the predetermined number of bins in step 226. One array of bins is for passing paths and the other array of bins for failing paths. The spreadsheet engine 12 initializes all the bins to a count of zero in step 228.

The spreadsheet engine 12 determines if there are more paths in the list of paths in step 230. If not, the spreadsheet engine 12 displays the histogram bar graph with the information contained in the bins as shown in FIG. 6 in step 232.

As long as there are more paths in the list of paths the spreadsheet engine 12 continues processing each path. The spreadsheet engine 12 calculates a bin index in step 234. The bin index is calculated by the following equation:

$$\text{index} = \text{round}((N^* \text{ (slack}-\text{min\_slack}))/\text{total range})$$

The round( ) function rounds the index down to the nearest whole number, wherein the bin array indices are zero-based. In the equation above, N is the predetermined number of bins and min_slack is the minimum slack value determined in step 222. "Slack" is the slack time for the current path in the list. The total range is that value calculated in step 224.

The spreadsheet engine 12 determines if the slack time for the current path is greater than the slack failure value in step 236. If so, the spreadsheet engine 12 increments the passing array bin indexed by the index value calculated in step 234. Otherwise, the spreadsheet engine 12 increments the failing array bin indexed by the index value calculated in step 234.

Thus, by performing the method described in FIG. 19, the present invention advantageously displays a histogram containing multi-dimensional timing quality feedback information to a floorplan designer enabling the floorplan designer to relate the timing information displayed in the histogram to a graphical view of the paths and/or nets selected by the designer, thus enabling the designer to employ his or her expert knowledge in making intuitive evaluations of the timing quality of the selected floorplan.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer-implemented method for aiding in the design of an integrated circuit floorplan, wherein said method is performed on a computer system comprising a display screen, an input device, and a processor, the method comprising:

receiving a floorplan comprising elements of an integrated circuit arranged across a layout space, said floorplan includes a plurality of nets which extend between a plurality of terminals arranged at specified coordinates within said physical layout space;

receiving timing constraints for at least a pair of said plurality of terminals;

calculating a net delay for a signal path, wherein said signal path comprises a portion of one of said plurality of nets, said portion extending between the pair of said plurality of terminals;

calculating a slack time as a function of said net delay and said timing constraints;

displaying on the display screen said slack time in a spreadsheet format; and creating at least one hyperlink between information within said floorplan and information within said spreadsheet.

2. The method as recited in claim 1, further comprising:

displaying on the display screen in said spreadsheet said timing constraints.

3. The method as recited in claim 1, wherein said hyperlink is associated with said signal path such that said hyperlink is configured for selecting said signal path and is selected in response to user input upon said input device.

4. The method as recited in claim 3, wherein said user input upon the input device corresponds to selection of said hyperlink.

5. The method as recited in claim 3, further comprising:

displaying said floorplan on said display screen; and displaying said signal path on the floorplan on the display screen in response to said selecting.

6. The method as recited in claim 1, wherein said hyperlink is associated with one of said plurality of nets such that said hyperlink is configured for selecting said one of said plurality of nets and is selected in response to user input upon said input device.

7. The method as recited in claim 6, further comprising:

displaying on the display screen the integrated circuit floorplan;

displaying said one of said plurality of nets on the floorplan on the display screen in response to said selecting.

8. The method as recited in claim 1, wherein each of said plurality of nets comprises at least one source terminal and at least one destination terminal, wherein said timing constraints comprise a driven at timing constraint associated with each of said at least one source terminal and a needed by timing constraint associated with each of said at least one destination terminal, wherein said pair of said plurality of terminals of said signal path comprises a source terminal and a destination terminal.

9. The method as recited in claim 8, wherein said calculating said net delay comprises:

calculating a rectilinear length between said source terminal and said destination terminal and multiplying said length by a predetermined delay per unit length time.

10. The method as recited in claim 8, wherein said integrated circuit is designed to operate at a predetermined clock cycle time.

11. The method as recited in claim 10, wherein said calculating said slack time comprises subtracting from said clock cycle time a sum of said driven at timing constraint, said needed by timing constraint, and said net delay for said signal path.

12. The method as recited in claim 11, further comprising:

determining if the slack time for said signal path is less than a slack failure value.

13. The method as recited in claim 12, further comprising:

displaying on the display screen in said spreadsheet a visual indicator for indicating if the slack time is less than the slack failure value.

14. The method as recited in claim 12, wherein said slack failure value is specified by user input.

15. The method as recited in claim 12, wherein said slack failure value is zero.

16. The method as recited in claim 12, further comprising:

setting said net delay to a zero value;

calculating said slack time to determine instances in which said floorplan fails to satisfy said timing constraints.

17. The method as recited in claim 1, further comprising:

selecting at least one signal path of said integrated circuit in response to user input;

wherein said calculating a slack time comprises calculating slack times for said at least one signal path selected.

18. The method as recited in claim 1, further comprising:

selecting at least one net of said integrated circuit in response to user input;

wherein said calculating a slack time comprises calculating slack times for each signal path associated with said at least one net selected.

19. The method as recited in claim 1, further comprising:

displaying on the display screen in said spreadsheet source and destination terminal identifiers associated with said signal path.

20. The method as recited in claim 1, further comprising:

displaying on the display screen in said spreadsheet said net delay.

21. A computer-readable storage media for operating in a computer system, the computer system including a display screen, an input device, memory, and a processor, wherein the storage media includes a substrate having a physical configuration representing data, the storage media comprising:

instructions for receiving a floorplan comprising elements of an integrated circuit arranged across a layout space, said floorplan includes a plurality of nets which extend between a plurality of terminals arranged at specified coordinates within said physical layout space;

instructions for receiving timing constraints for at least a pair of said plurality of terminals;

instructions for calculating a net delay for a signal path, wherein said signal path comprises a portion of one of said plurality of nets, said portion extending between the pair of said plurality of terminals;

instructions for calculating a slack time as a function of said net delay and said timing constraints;

instructions for displaying on the display screen said slack time in a spreadsheet format; and instructions for creating at least one hyperlink between information within said floorplan and information within said spreadsheet.

22. The media as recited in claim 21, further comprising:

instructions for displaying on the display screen in said spreadsheet said timing constraints.

23. The media as recited in claim 21, further comprising:

instructions for displaying on the display screen in said spreadsheet said net delay.

24. The media as recited in claim 21, further comprising:

instructions for displaying said floorplan on said display screen; and instructions for displaying said signal path on the floorplan on the display screen in response to user input.

25. The media as recited in claim 21, further comprising:

instructions for selecting at least one signal path of said integrated circuit in response to user input;

wherein said instructions for calculating a slack time comprises instructions for calculating slack times for said at least one signal path selected.

26. The media as recited in claim 21, further comprising:

instructions for displaying on the display screen in said spreadsheet source and destination terminal identifiers associated with said signal path.

27. An integrated circuit having a floorplan designed using a computer-implemented method, wherein said method is performed on a computer system comprising a display screen, an input device, and a processor, the method comprising:

receiving a floorplan comprising elements of an integrated circuit arranged across a layout space, said floorplan includes a plurality of nets which extend between a plurality of terminals arranged at specified coordinates within said physical layout space;

receiving timing constraints for at least a pair of said plurality of terminals;

calculating a net delay for a signal path, wherein said signal path comprises a portion of one of said plurality of nets, said portion extending between the pair of said plurality of terminals;

calculating a slack time as a function of said net delay and said timing constraints;

displaying on the display screen said slack time in a spreadsheet format; and creating at least one hyperlink between information within said floorplan and information within said spreadsheet.

28. The circuit as recited in claim 27, wherein said method further comprises:

displaying on the display screen in said spreadsheet said timing constraints.

29. The circuit as recited in claim 27, wherein said method further comprises:

displaying on the display screen in said spreadsheet said net delay.

30. The circuit as recited in claim 27, wherein said method further comprises:

displaying on the display screen in said spreadsheet source and destination terminal identifiers associated with said signal path.

31. The circuit as recited in claim 27, wherein said method further comprises:

displaying said floorplan on said display screen; and displaying said signal path on the floorplan on the display screen in response to user input.

32. The circuit as recited in claim 27, wherein said method further comprises:

selecting at least one signal path of said integrated circuit in response to user input;

wherein said calculating a slack time comprises calculating slack times for said at least one signal path selected.

* * * * *